US012809554B2

(12) United States Patent
Moon et al.

(10) Patent No.: US 12,809,554 B2
(45) Date of Patent: Nov. 24, 2026

(54) STORAGE DEVICE USING SEPARATE COMMAND/ADDRESS INTERFACE AND OPERATION METHOD THEREOF

(71) Applicant: Samsung Electronics Co., Ltd., Suwon-si (KR)

(72) Inventors: Young Sik Moon, Suwon-si (KR); Hyunjoon Yoo, Suwon-si (KR); Seunghan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 18/985,425

(22) Filed: Dec. 18, 2024

(65) Prior Publication Data

US 2026/0023503 A1 Jan. 22, 2026

(30) Foreign Application Priority Data

Jul. 17, 2024 (KR) ........................ 10-2024-0094182

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS 9,159,438 B2 10/2015 Im
10,152,380 B2 12/2018 Yim et al.
10,564,858 B2 2/2020 Jiang et al.
10,593,382 B2 3/2020 Kang et al.
11,206,046 B2 12/2021 Shin et al.
11,372,593 B2 6/2022 Lee et al.
11,977,771 B2 5/2024 Kim et al.
2018/0059943 A1 3/2018 Lueker-Boden et al.
2022/0164143 A1 5/2022 Kim et al.
2023/0162766 A1 5/2023 Jo et al.
2023/0176759 A1 6/2023 Park et al.
2023/0297523 A1 9/2023 Mozak et al.
2023/0402071 A1* 12/2023 Park .................... G11C 11/5671

FOREIGN PATENT DOCUMENTS

CN 110444236 B 3/2022
KR 102585221 B1 10/2023
KR 20250062533 A * 5/2025 .......... H03M 7/6011

OTHER PUBLICATIONS

Extended European Search Report in European Appln. No. 25188921.8, mailed on Nov. 19, 2025, 9 pages.

* cited by examiner

*Primary Examiner* — Brian R Peugh
(74) *Attorney, Agent, or Firm* — Fish & Richardson P.C.

(57) ABSTRACT

Disclosed is a storage device comprising, a storage controller configured to transmit a command and an address with a command/address line separated from a data line, and a nonvolatile memory device configured to sense read data and reliability data from a memory area corresponding to the address and transmits the read data and the reliability data to the storage controller. The storage controller is configured to transmit a setting signal associated with controlling output of the reliability data to the nonvolatile memory device using the command/address line.

20 Claims, 16 Drawing Sheets

SD (1236)

| B \ DQ | 0 | 1 | 2 | 3 | 4 | 5 | 6 | 7 |
|---|---|---|---|---|---|---|---|---|
| 1 | 0 | 0 | 0 | 0 | 0 | 0 | 0 | 0 |
| 2 | 0 | 0 | 1 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 1 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 1 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |
| 16 | 0 | 0 | 1 | 0 | 0 | 0 | 0 | 0 |

Mapping Talbe (1237)

| B \ DQ | 0 | 1 | 2 | 3 | 4 | 5 | 6 | 7 |
|---|---|---|---|---|---|---|---|---|
| 1 | 0x00 | 0x01 | 0x02 | 0x03 | 0x04 | 0x05 | 0x06 | 0x07 |
| 2 | 0x08 | 0x09 | 0x0A | 0x0B | 0x0C | 0x0D | 0x0E | 0x0F |
| 3 | 0x10 | 0x11 | 0x12 | 0x13 | 0x14 | 0x15 | 0x16 | 0x17 |
| 4 | 0x18 | 0x19 | 0x1A | 0x1B | 0x1C | 0x1D | 0x1E | 0x1F |
| 5 | 0x20 | 0x21 | 0x22 | 0x23 | 0x24 | 0x25 | 0x26 | 0x27 |
| 6 | 0x28 | 0x29 | 0x2A | 0x2B | 0x2C | 0x2D | 0x2E | 0x2F |
| 7 | 0x30 | 0x31 | 0x32 | 0x33 | 0x34 | 0x35 | 0x36 | 0x37 |
| 8 | 0x38 | 0x39 | 0x3A | 0x3B | 0x3C | 0x3D | 0x3E | 0x3F |
| 9 | 0x40 | 0x41 | 0x42 | 0x43 | 0x44 | 0x45 | 0x46 | 0x47 |
| 10 | 0x48 | 0x49 | 0x4A | 0x4B | 0x4C | 0x4D | 0x4E | 0x4F |
| 11 | 0x50 | 0x51 | 0x52 | 0x53 | 0x54 | 0x55 | 0x56 | 0x57 |
| 12 | 0x58 | 0x59 | 0x5A | 0x5B | 0x5C | 0x5D | 0x5E | 0x5F |
| 13 | 0x60 | 0x61 | 0x62 | 0x63 | 0x64 | 0x65 | 0x66 | 0x67 |
| 14 | 0x68 | 0x69 | 0x6A | 0x6B | 0x6C | 0x6D | 0x6E | 0x6F |
| 15 | 0x70 | 0x71 | 0x72 | 0x73 | 0x74 | 0x75 | 0x76 | 0x77 |
| 16 | 0x78 | 0x79 | 0x7A | 0x7B | 0x7C | 0x7D | 0x7E | 0x7F |

FIG. 11

SCA Header Definition Table

| Header rising edge | | Header falling edge | | CA Packet Type | CA Packet Structure |
|---|---|---|---|---|---|
| CA[1] | CA[0] | CA[1] | CA[0] | | |
| 0 | 0 | 0 | 0 | CA Data Output | Output |
| 0 | 0 | 1 | 0 | CA Data Input | Input |
| 0 | 1 | 0 | 0 | Address | Input |
| 1 | 0 | 0 | 0 | Command | Input |

STORAGE DEVICE USING SEPARATE COMMAND/ADDRESS INTERFACE AND OPERATION METHOD THEREOF

CROSS-REFERENCE TO RELATED APPLICATIONS

This application claims priority under 35 U.S.C. § 119 to Korean Patent Application No. 10-2024-0094182 filed on Jul. 17, 2024, in the Korean Intellectual Property Office, the disclosures of which are incorporated by reference herein in their entireties.

BACKGROUND

Example embodiments of the inventive concepts described herein relate to a semiconductor memory device, and more particularly, to a storage device using a separate command/address interface and an operating method thereof.

Semiconductor memory devices can be broadly divided into volatile memory and non-volatile memory. Volatile memory (e.g., DRAM and/or SRAM) has fast read/write speeds, but stored data disappears when power is cut off. On the other hand, non-volatile memory can maintain stored data even when power is cut off. A representative example of non-volatile memory is flash memory.

As technology advances, the demand for increased data input/output speeds of flash memory devices is increasing. In particular, it may be difficult to sufficiently meet this demand for high speed with the existing interfacing method of inputting commands, addresses, and data through input/output pins. Therefore, attempts to separate command/address pins and data pins are also being applied to non-volatile memory devices. There is a desire for techniques for efficient memory operation using the separate command/address (SCA) interface.

SUMMARY

Example embodiments of the present disclosure provides a storage device capable of transmitting high-speed, high-efficiency, and/or reliability data using a separated command/address (SCA) method interface.

According to some example embodiments, a storage device comprising, a storage controller configured to transmit a command and an address with a command/address line separated from a data line, and a nonvolatile memory device configured to sense read data and reliability data from a memory area corresponding to the address and transmits the read data and the reliability data to the storage controller. The storage controller is configured to transmit a setting signal associated with controlling output of the reliability data to the nonvolatile memory device using the command/address line.

Alternatively or additionally according to some example embodiments, a method of operating a storage controller for controlling a nonvolatile memory device, comprises transmitting a command and an address requesting compressed soft-decision data to the nonvolatile memory device through a command/address line separated from a data line, receiving the compressed soft-decision data output from the nonvolatile memory device, and decompressing the compressed soft-decision data.

Alternatively or additionally according to some example embodiments, an operating method of a nonvolatile memory device, comprises receiving a command and an address requesting soft-decision data through a command/address line separated from a data line, sensing a memory area corresponding to the command and the address to generate the soft-decision data and hard-decision data, and transmitting the soft-decision data or the hard-decision data to a storage controller in response to a start signal provided through the command/address line.

BRIEF DESCRIPTION OF THE FIGURES

The above and other objects and features of the present disclosure will become apparent by describing in detail some example embodiments thereof with reference to the accompanying drawings.

FIG. 11 is a table showing example definitions according to bit values of the packet header of FIG. 10.

DETAILED DESCRIPTION

It is to be understood that both the foregoing general description and the following detailed description are examples, and it is to be considered that an additional description of the claimed inventive concepts is provided. Reference signs are indicated in detail in preferred example embodiments of the inventive concepts, examples of which are indicated in the reference drawings. Wherever possible, the same reference numbers are used in the description and drawings to refer to the same or like parts.

Figure 1:
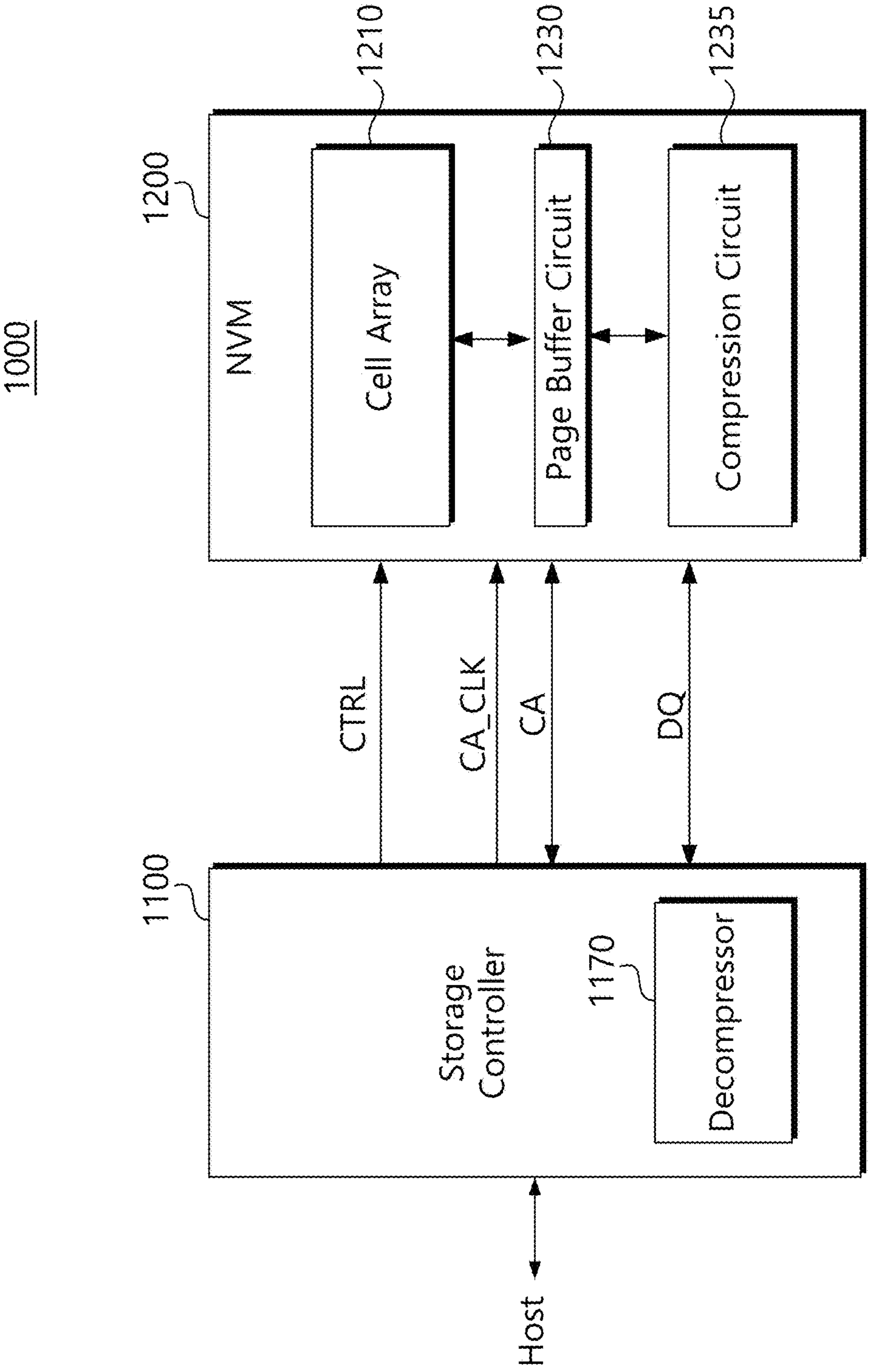
FIG. 1 is a block diagram showing a storage device according to some example embodiments of the inventive concepts.

FIG. 1 is a block diagram showing a storage device according to example embodiments of the inventive concepts. Referring to FIG. 1, the storage device 1000 may include a storage controller 1100 and a nonvolatile memory device 1200. The storage controller 1100 may access the nonvolatile memory device 1200 according to a separate command/address SCA protocol. For example, each of the storage controller 1100 and the nonvolatile memory device 1200 may be provided as one chip, one package, or one module. Alternatively, the storage controller 1100 and the nonvolatile memory device 1200 may separately be configured as one chip, one package, or one module. The storage controller 1100 and the nonvolatile memory device 1200 may configure storage devices such as one or more of embedded memory, memory cards, memory sticks, and solid state drive SSD.

The storage controller 1100 writes data to the nonvolatile memory device 1200 and/or reads data stored in the nonvolatile memory device 1200 according to a request from the host. Data requested to be written by the host may be stored in the nonvolatile memory device 1200 under the control of the storage controller 1100. The storage controller 1100 generates a command CMD, an address ADDR, a clock signal CA_CLK, and a control signal CTRL for accessing the nonvolatile memory device 1200.

The storage controller 1100 and the nonvolatile memory device 1200 use the separate command/address SCA protocol for data exchange. For example, the storage controller 1100 uses a command/address line CA separate from the data line DQ to transmit a command and an address. For example, when providing a write command of data, the storage controller 1100 transmits the command and address to the nonvolatile memory device 1200 through the command/address line CA. On the other hand, the storage controller 1100 transmits the write data to the nonvolatile memory device 1200 through the data line DQ.

In particular, the storage controller 1100 of some example embodiments can receive the read data output from the nonvolatile memory device 1200 through the data line DQ during a data read operation. The storage controller 1100 can receive reliability information indicating the reliability of the read data through the command/address line CA. The reliability information may be or may include, for example, soft-decision data SD and/or compressed soft-decision data CSD. If the reliability information is compressed soft-decision data CSD, the storage controller 1100 may process the compressed soft-decision data CSD output from the nonvolatile memory device 1200 through the command/address line CA using the decompressor 1170. The decompressed soft-decision data may be used for decoding hard-decision data HD output through the data line DQ.

In order to apply the separate command/address SCA protocol, the storage controller 1100 uses the clock signal CA_CLK for driving the command/address line CA. Data transmitted to the command/address line CA in synchronization with the clock signal CA_CLK can be transmitted to the nonvolatile memory device 1200.

The nonvolatile memory device 1200 exchanges data with the storage controller 1100 according to the separate command/address SCA protocol. The nonvolatile memory device 1200 may receive commands and addresses from the storage controller 1100 through the command/address line CA. In a write operation, the nonvolatile memory device 1200 may receive read commands and addresses through the command/address line CA and write data through the data line DQ. In a read operation, the nonvolatile memory device 1200 can receive read commands and addresses through the command/address line CA. In response to the read command, a page buffer circuit 1230 may sense the target area of a cell array 1210 and store data therein as read data. The read data provided as a result of the read operation may include hard-decision data HD and soft-decision data SD.

In some example embodiments, the hard-decision data HD may be transmitted to the storage controller 1100 through the data line DQ, and the soft-decision data SD may be transmitted through the command/address line CA. In particular, the soft-decision data SD may be compressed for transmission efficiency to the command/address line CA. For the compression of the soft-decision data SD, the nonvolatile memory device 1200 may include a compression circuit 1235. At this time, the setting of the compression operation, such as one or more of the compression start, compression ratio, and compression end for the soft-decision data SD, may be provided through the command/address line CA. In other example embodiments, both the hard-decision data HD and the soft-decision data SD may be transmitted to the storage controller 1100 through the data line DQ. Even at this time, a compression circuit 1235 may be used to compress the soft-decision data SD. Compression setting signals such as a start signal, a compression ratio change signal #, and an end signal that control the output of the soft-decision data SD may be provided to the nonvolatile memory device 1200 through the command/address line CA.

The nonvolatile memory device 1200 may include the cell array 1210, the page buffer circuit 1230, and the compression circuit 1235. The cell array 1210 may include a plurality of memory blocks, respectively. Each of the plurality of memory blocks may have a vertical three-dimensional structure; however, example embodiments are not limited thereto. Each memory block may be composed of a plurality of memory cells such as but not limited to single-level cells and/or multi-level cells. The cell array 1210 may be located on the side and/or above the page buffer circuit 1230.

The page buffer circuit 1230 may include analog circuits or digital circuits used to store data in the cell array 1210 and/or read data stored in the cell array 1210. The page buffer circuit 1230 may program data requested to be written into a target area of the cell array 1210. The page buffer circuit 1230 may sense data requested to be read from a target area of the cell array 1210. At this time, the page buffer circuit 1230 may generate hard-decision data HD and soft-decision data SD for the target area.

The compression circuit 1235 performs compression on the soft-decision data SD in response to a compression control setting provided through a command/address line CA. The compression setting signal such as the start signal START, the compression ratio change signal CR #, and the end signal END is provided through the command/address line CA. The compression circuit 1235 performs operations such as starting compression, changing the compression ratio, and terminating compression for soft-decision data SD in response to a compression setting signals. Compressed soft-decision data (hereinafter, CSD) can be output through the data line DQ or the command/address line CA. The method of outputting the compressed soft-decision data CSD will be described in more detail through the drawings described below.

The configuration of the storage device 1000 of the inventive concepts has been briefly described above. In particular, the storage device 1000 of the inventive concepts can transmit reliability data between the storage controller 1100 and the nonvolatile memory device 1200 at high speed according to the separate command/address SCA protocol. Since the compression control of the reliability data is easy or relatively easy according to a separate command/address SCA protocol, the compression speed can be improved. According to some example embodiments of the inventive concepts, it may be possible to improve the decoding speed of soft-decision data SD and hard-decision data HD in the storage controller 1100.

Figure 2:
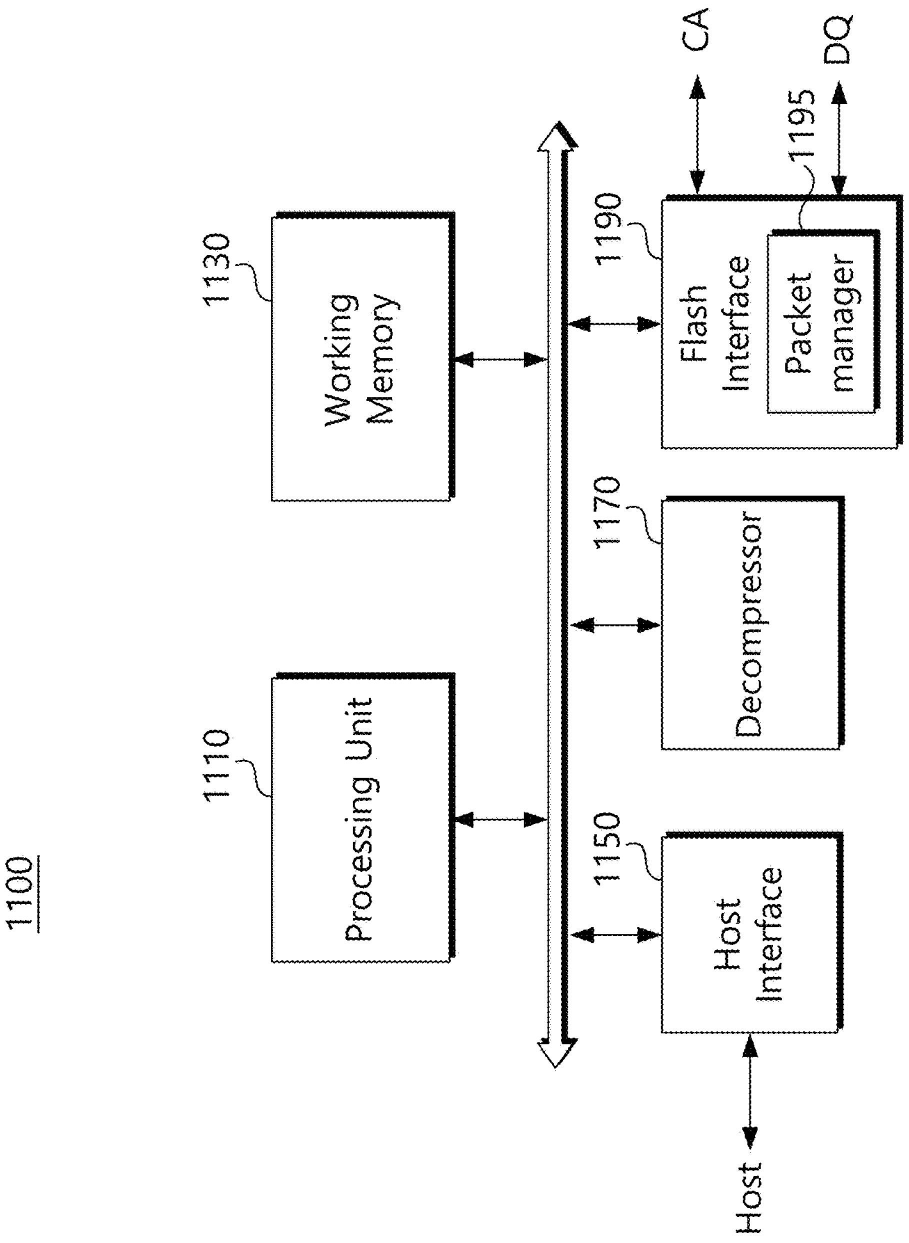
FIG. 2 is a block diagram showing the configuration of the storage controller of FIG. 1 in more detail.

FIG. 2 is a block diagram showing configuration of the storage controller of FIG. 1 in more detail. Referring to FIG. 2, the storage controller 1100 of the inventive concepts includes a processing unit 1110, a working memory 1130, a host interface 1150, a decompressor 1170, and a flash interface 1190. However, it will be well understood that the components of the storage controller 1100 are not limited to the components illustrated. For example, the storage controller 1100 may alternatively or additionally include a read only memory ROM that stores code data used for a booting operation or an error correction code ECC block.

The processing unit 1110 may include a central processing unit or a microprocessor. The processing unit 1110 may drive firmware that is executed in the storage controller 1100. In particular, the processing unit 1110 can drive various firmware or software loaded into the working memory 1130. The processing unit 1110 can execute firmware and/or software that is in charge of core functions of the storage device 1000, such as the host interface layer HIL or the flash translation layer FTL.

Software (or firmware) or data for controlling the storage controller 1100 is loaded into the working memory 1130. The software and data loaded into the working memory 1130 are driven or processed by the processing unit 1110. The flash translation layer (FTL, not shown) driven by the processing unit 1110 generally performs functions such as address mapping, garbage collection, and wear leveling.

The host interface 1150 provides an interface between the host and the storage controller 1100. The host and the storage controller 1100 can be connected via one or more of various standardized interfaces. Here, the standardized interfaces include various interface methods such as advanced technology attachment ATA, serial advanced technology attachment SATA, external SATA (e-SATA), small computer small interface SCSI, serial attached SCSI SAS, peripheral component interconnection PCI, PCI Express PCIe, universal serial bus USB, IEEE 1394, universal flash storage UFS, embedded Multi Media Card eMMC), NVMe, etc.

The decompressor 1170 decompresses the compressed soft-decision data CSD transmitted from the nonvolatile memory device 1200. The decompressor 1170 decompresses the compressed soft-decision data CSD according to the detected compression ratio CR. Afterwards, if a failure occurs in error correction decoding for hard-decision data HD, error correction can be performed through decoding using soft-decision data SD. In other example embodiments, the decompressor 1170 may be included in an error correction block.

The flash interface 1190 provides an interface between the storage controller 1100 and the nonvolatile memory device 1200. For example, data processed by the processing unit 1110 is stored in the nonvolatile memory device 1200 through the flash interface 1190. As another example, data stored in the nonvolatile memory device 1200 can be output to the storage controller 1100 through the flash interface 1190. In particular, the flash interface 1190 communicates with the nonvolatile memory device 1200 using the separate command/address SCA protocol of the inventive concepts. For example, the flash interface 1190 can communicate with the nonvolatile memory device 1200 through the command/address line CA that operates separately from the data line DQ.

In order to apply the separate command/address SCA protocol, the flash interface 1190 can include a packet manager 1195. The packet manager 1195 can generate a packet according to the separate command/address SCA protocol for communication with the nonvolatile memory device 1200. For example, the packet manager 1195 can generate a command packet of the command/address line CA for transmitting a write command or a read command. Alternatively or additionally, the packet manager 1195 can parse a packet received from the command/address line CA and the data line DQ in response to a read command. The flash interface 1190 can transmit compression setting signals such as a start signal START, a compression ratio change signal CR #, and an end signal END to the nonvolatile memory device 1200 through the command/address line CA.

According to the storage controller 1100 of inventive concepts described above, the storage controller 1100 can receive reliability data of read data from the nonvolatile memory device 1200 by applying the separate command/address SCA protocol. For example, the storage controller 1100 can receive compressed soft-decision data CSD according to the separate command/address SCA protocol. High-speed transmission of reliability data such as compressed soft-decision data CSD is possible by utilizing the command/address line CA separated from the data line DQ.

Figure 3:
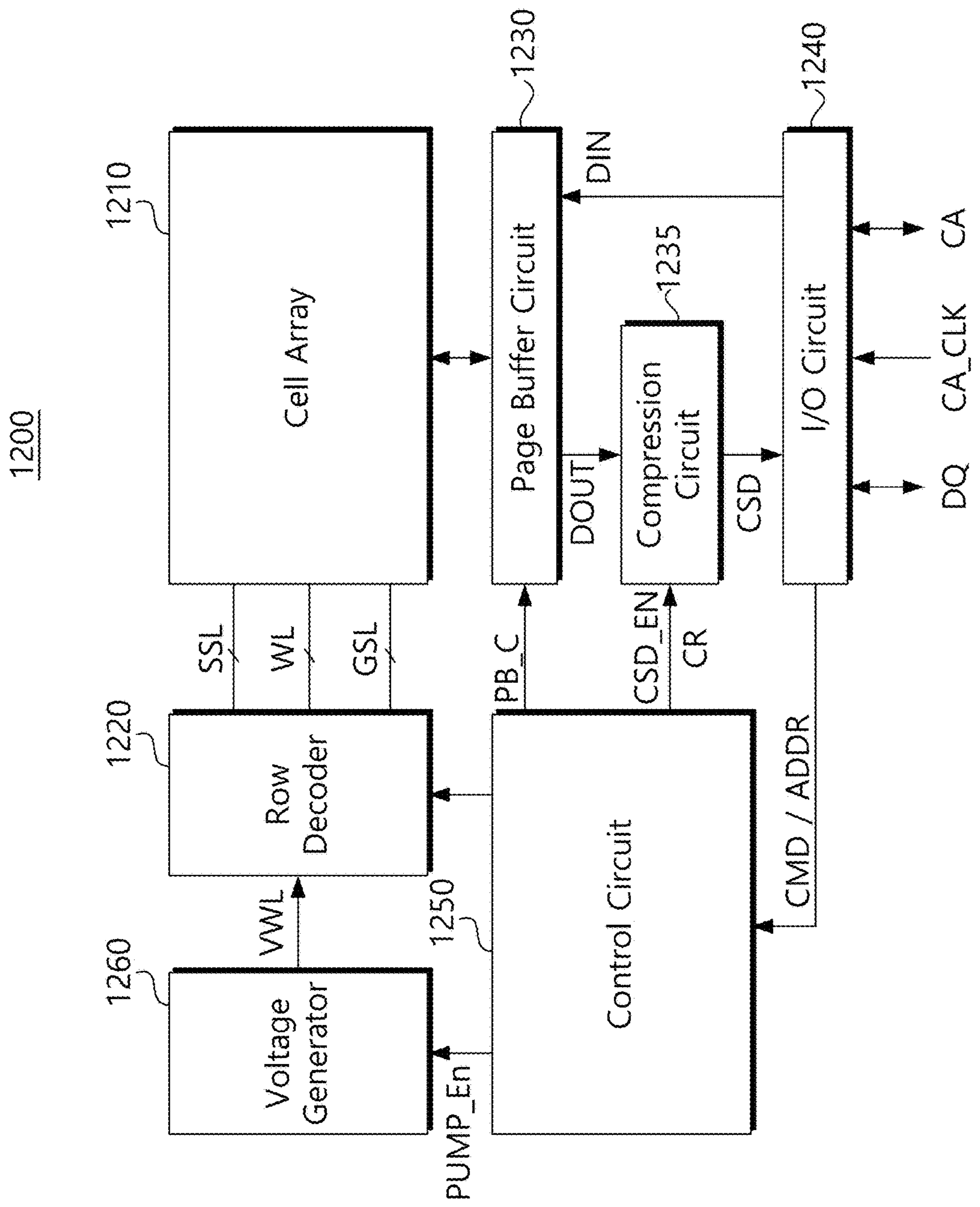
FIG. 3 is a block diagram showing the structure of the nonvolatile memory device of FIG. 1 in more detail.

FIG. 3 is a block diagram showing the structure of the nonvolatile memory device of FIG. 1 in more detail. Referring to FIG. 3, the nonvolatile memory device 1200 includes a cell array 1210, a row decoder 1220, a page buffer circuit 1230, a compression circuit 1235, an input/output circuit 1240, a control circuit 1250, and a voltage generator 1260.

The cell array 1210 may include a plurality of memory blocks. Each of the plurality of memory blocks may have a vertical three-dimensional structure; example embodiments are not limited thereto. Each of the memory blocks may be composed of a plurality of pages. Each page may be composed of a plurality of memory cells. Each memory block may be an erase unit, and each page may be a read or write unit. The cell array 1210 may be formed in a direction perpendicular to the substrate. A gate electrode layer and an insulation layer may be alternately deposited on the substrate. Each memory block can be connected to a string selection line SSL, a plurality of word lines, and a ground selection line GSL. The number of stacked gate electrode films on which the word lines of the cell array 1210 are formed may increase as the product generation develops.

The row decoder 1220 can select a word line of the cell array 1210 in response to an address ADDR. The row decoder 1220 provides a word line voltage VWL provided from a voltage generator 1260 to the cell array 1210 through the selection lines SSL and GSL and the word line WL. The row decoder 1220 can select word line during a program or read operation. The row decoder 1220 can provide a program voltage or a read voltage to the selected word line.

The page buffer circuit 1230 can be connected to the cell array 1210 through a bit line. The page buffer circuit 1230 can precharge or sense bit lines connected to memory cells in response to a page buffer control signal PB_C provided from a control circuit 1250. The page buffer circuit 1230 can operate as a write driver or a sense amplifier depending on the operation mode. During a program operation, the page buffer circuit 1230 can apply a bit line voltage corresponding to data to be programmed to a selected bit line. During a read operation, the page buffer circuit 1230 can sense data stored in a memory cell by detecting a current or voltage of the selected bit line.

The page buffer circuit 1230 can sense hard-decision data HD and soft-decision data SD for the selected memory cells in response to the page buffer control signal PB_C. The page buffer circuit 1230 performs sensing for the memory cell based on the hard-decision read voltage to generate hard-decision data HD. The page buffer circuit 1230 can detect data stored in a selected memory cell based on a soft-decision read voltage and generate soft-decision data SD. The page buffer circuit 1230 can provide the soft-decision data SD to the compression circuit 1235 as part of the output data DOUT.

The compression circuit 1235 can perform compression on the soft-decision data SD provided from the page buffer circuit 1230 according to the control signals CSD_EN and CR of the control circuit 1250. The compression circuit 1235 can start and/or can end the compression operation of the soft-decision data SD according to the compression enable signal CSD_EN. The compression circuit 1235 can change the compression ratio of the soft-decision data SD according to the compression ratio control signal CR.

The input/output circuit 1240 receives write data, commands, addresses, and control signals provided from the storage controller 1100. The commands and addresses received by the input/output circuit 1240 may be provided to the control circuit 1250. The input/output circuit 1240 receives write data, command CMD, and address ADDR according to the separate command/address SCA protocol. For example, the input/output circuit 1240 parses the command CMD and address ADDR provided in the form of packets through the command/address lines CA and transmits them to the control circuit 1250. The input/output circuit 1240 may transmit write data transmitted through the data lines DQ to the page buffer circuit 1230. The input/output circuit 1240 may encode compressed soft-decision data CSD in the form of packets and output them to the outside through the command/address lines CA. Alternatively or additionally in some example embodiments, the input/output circuit 1240 may output the compressed soft-decision data CSD to the outside through the data line DQ. The input/output circuit 1240 may receive compression setting signals transmitted in the form of packets, such as a start signal START, a compression ratio change signal CR #, and an end signal END of the compression circuit 1235, through the command/address lines CA. The input/output circuit 1240 may parse the received compression setting signals and then transmit them to the control circuit 1250 or the compression circuit 1235. The reception of the compression setting signals may be performed in synchronization with the clock signal CA_CLK.

The control circuit 1250 may control various operations within the nonvolatile memory device 1200 according to an operation mode. The control circuit 1250 may perform program, read, and erase operations in response to a control signal CTRL, a command CMD, and/or an address ADDR. For example, the control circuit 1250 can generate a pump enable signal PUMP_En, a page buffer control signal PB_C for a program operation. The control circuit 1250 may control the voltage generator 1260 to generate a voltage required for a read, write, and erase operation by providing the pump enable signal PUMP_En. The control circuit 1250 may control the compression circuit 1235 based on compression setting signals such as a start signal START, a compression ratio change signal CR #, and an end signal END provided through a command/address lines CA.

The voltage generator 1260 may generate a word line voltage VWL required for or used for reading or writing data in response to the pump enable signal PUMP_En from the control circuit 1250. The word line voltage VWL can be provided to a selected word line or an unselected word line through the row decoder 1220. The voltage generator 1260 can include a charge pump (not shown) for this purpose. The voltage generator 1260 can generate a word line voltage provided during a program operation or a word line voltage provided during the read operation. The voltage generator 1260 can provide a hard-decision read voltage or a soft-decision read voltage for the hard-decision read or soft-decision read of the inventive concepts to the word lines of the selected area or memory cells.

In the above, according to the nonvolatile memory device 1200 of the inventive concepts, a command, an address, and data can be received from the storage controller 1100 according to the separate command/address SCA protocol. The nonvolatile memory device 1200 can output reliability data such as soft-decision data SD through the command/address lines CA. Alternatively or additionally, the compression setting signals for controlling the compression operation of the soft-decision data SD can be provided through the command/address line CA. Therefore, the nonvolatile memory device 1200 can increase the utilization of the command/address lines CA through the transmission of reliability data, alternatively or additionally, the nonvolatile memory device 1200 can provide reliability data to the storage controller 1100 at high speed.

Figure 4:
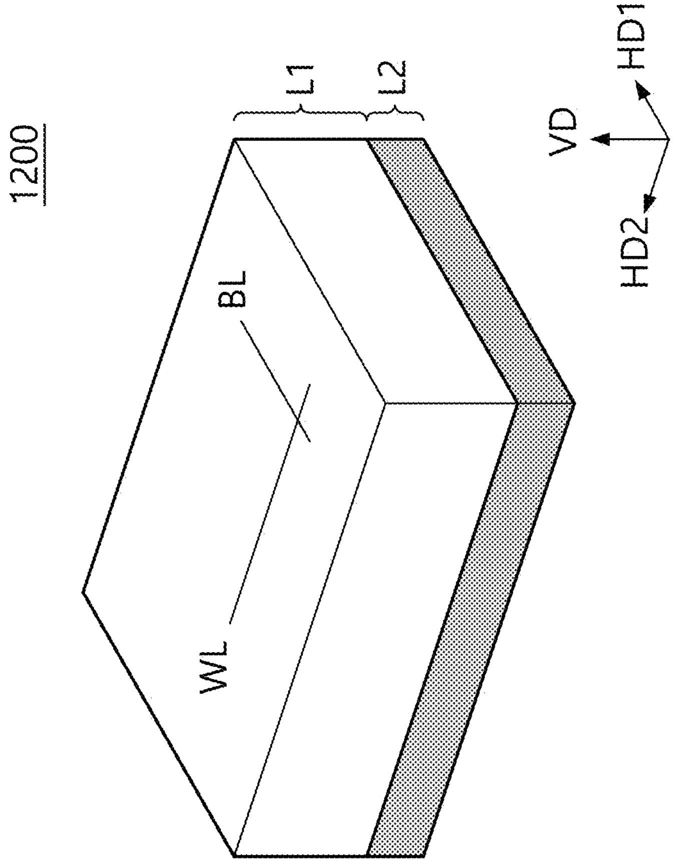
FIG. 4 is a block diagram schematically showing the structure of the nonvolatile memory device according to some example embodiments of the inventive concepts.

FIG. 4 is a block diagram schematically showing the structure of a nonvolatile memory device according to example embodiments of the inventive concepts. Referring to FIG. 4, the nonvolatile memory device 1200 can include a first semiconductor layer L1 and a second semiconductor layer L2, and the first semiconductor layer L1 can be stacked in a vertical direction VD with respect to the second semiconductor layer L2. For example, the second semiconductor layer L2 may be arranged below the first semiconductor layer L1 in a vertical direction VD, and thus, the second semiconductor layer L2 may be arranged close to the substrate.

In some example embodiments, the cell array 1210 of FIG. 2 may be formed on the first semiconductor layer L1, and peripheral circuits corresponding to the row decoder 1220, the page buffer circuit 1230, the control circuit 1250, and the voltage generator 1260 of FIG. 2 may be formed on the second semiconductor layer L2. Accordingly, the nonvolatile memory device 1200 may have a structure in which the cell array 1210 is arranged on top of the peripheral circuits (1220, 1230, 1235, 1240, 1250, 1260), e.g., a cell over periphery COP structure. The COP structure may effectively reduce the horizontal area and improve the integration of the nonvolatile memory device 1200. However, example embodiments are not limited thereto.

In some example embodiments, the second semiconductor layer L2 can include the substrate, and by forming transistors and metal patterns for wiring the transistors on the substrate, the peripheral circuits (one or more of 1220,

1230, 1235, 1240, 1250, 1260) can be formed in the second semiconductor layer L2. After the peripheral circuits (1220, 1230, 1235, 1240, 1250, 1260) are formed on the second semiconductor layer L2, the first semiconductor layer L1 including the cell array 1210 can be formed, and metal patterns can be formed to electrically connect the word lines WL and bit lines BL of the cell array 1210 and the peripheral circuits (1220, 1230, 1235, 1240, 1250, 1260) formed on the second semiconductor layer L2. For example, the bit lines BL can extend in the first horizontal direction HD1, and the word lines WL can extend in the second horizontal direction HD2.

Figure 5:
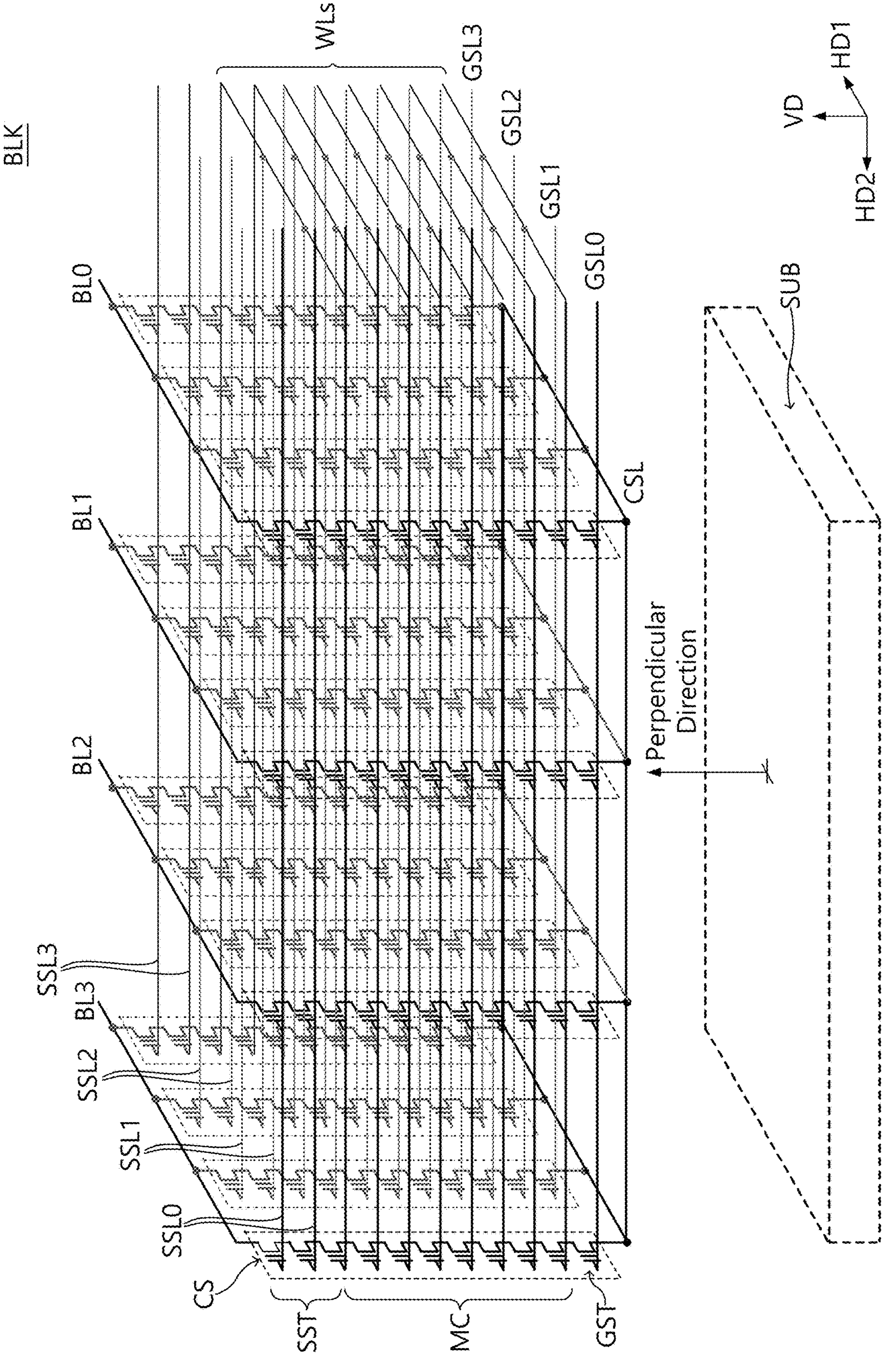
FIG. 5 is a circuit diagram showing an some example structure of a memory block constituting the cell array of FIG. 3.

FIG. 5 is a circuit diagram showing an example structure of a memory block constituting the cell array of FIG. 3. Referring to FIG. 5, cell strings CS are formed between bit lines BL0, BL1, BL2, and BL3 and a common source line CSL to form a memory block BLK.

A plurality of cell strings are formed between the bit line BL0 and the common source line CSL. The string selection transistors SST of the cell strings CS are connected to the corresponding bit lines BL. The ground selection transistors GST of the cell strings CS are connected to the common source line CSL. Memory cells MCs are provided between the string selection transistors SST and the ground selection transistors GST of the cell strings CS.

Each of the cell strings CS includes a ground selection transistor GST. The ground selection transistors GST included in the cell strings CS can be controlled by the ground selection line GSL. Or, although not shown, the cell strings corresponding to each row can be controlled by different ground selection lines.

In the above, the circuit structure of the memory cells included in one memory block BLK has been briefly described. However, the circuit structure of the illustrated memory block is a simplified structure for the convenience of explanation, and the actual memory block is not limited to the illustrated example. For example, it may be understood that one physical block can include more or fewer semiconductor layers, bit lines BLs, and string selection lines SSLs.

Figure 6:
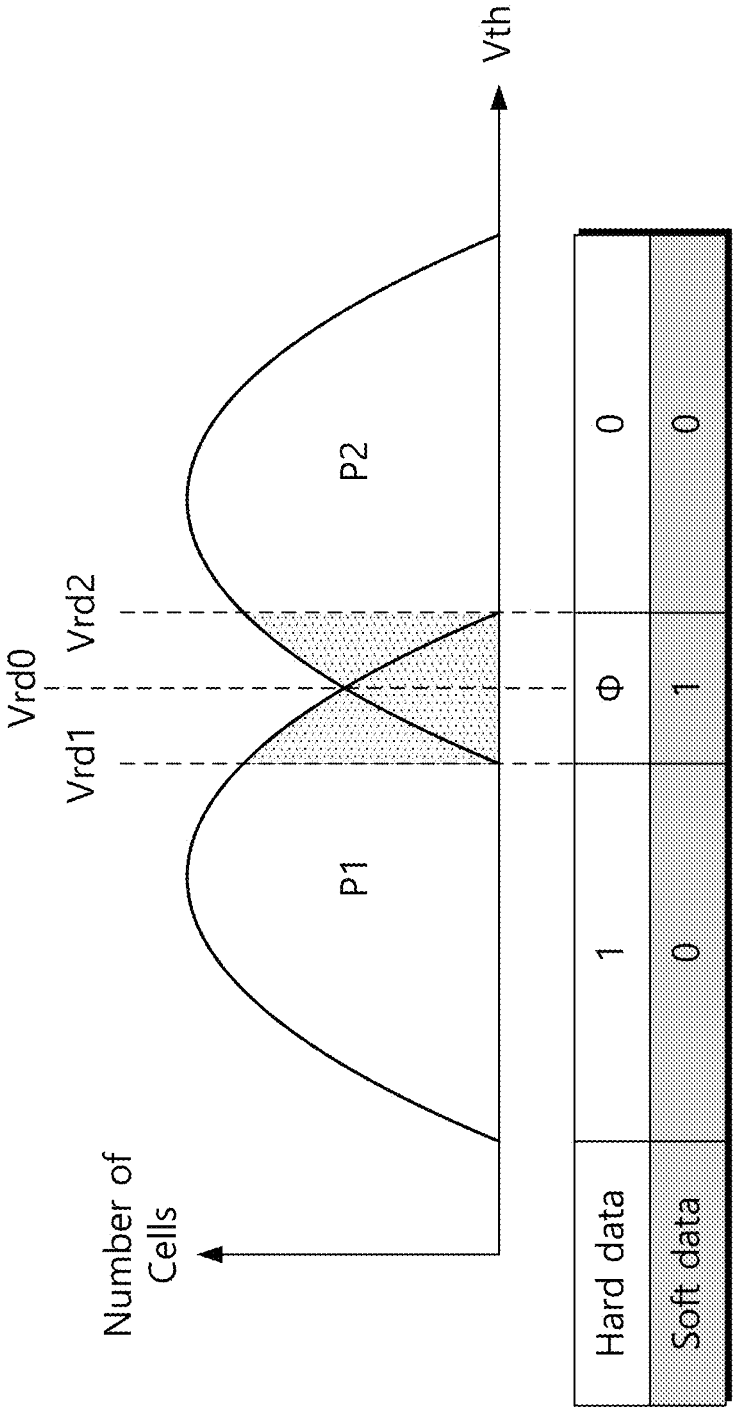
FIG. 6 is a diagram briefly showing a hard-decision read and soft-decision read method.

FIG. 6 is a drawing briefly showing a hard-decision read and a soft-decision read method. Referring to FIG. 6, the nonvolatile memory device 1200 performs hard-decision read and soft-decision read which may increase the reliability of read data. The soft-decision data SD generated as a result of the soft-decision read is used as reliability data for error correction of the hard-decision read data. For the sake of simplicity, the hard-decision read and soft-decision read operations between two program states P1 and P2 will be described.

The nonvolatile memory device 1200 performs the hard-decision read and soft-decision read using the hard-decision read voltage Vrd0 and the soft-decision read voltages Vrd1 and Vrd2 for identifying the overlapping portion of the program states P1 and P2. During the hard-decision read operation, the hard-decision read voltage Vrd0 is provided to the word line of the selected memory cells. In some example embodiments the on-cell/off-cell status of the selected memory cells is sensed by the page buffer circuit (1230, see FIG. 3). The sensed hard-decision data (Hard data: hereinafter, HD) can be output through the input/output circuit (1240, see FIG. 3).

In a soft-decision read operation, a threshold voltage state of memory cells selected by a first soft-decision read voltage Vrd1 is sensed. If the threshold voltage of the selected memory cells is lower than the first soft-decision read voltage Vrd1, soft-decision data SD is sensed as logic '0'. Subsequently, a threshold voltage state of the selected memory cells is sensed by a second soft-decision read voltage Vrd2. Even if the threshold voltage of the selected memory cells is higher than the second soft-decision read voltage Vrd2, soft-decision data SD is sensed as logic '0'. If the threshold voltage of the selected memory cells corresponds between the first soft-decision read voltage Vrd1 and the second soft-decision read voltage Vrd2, soft-decision data SD will be generated as logic '1'. The soft-decision data SD can generally be generated through an exclusive OR (XOR) logic operation of the sensing results by the first soft-decision read voltage Vrd1 and the second soft-decision read voltage Vrd2.

Here, the overlapping area of the program states P1 and P2 may be relatively narrow. Therefore, there may not be many cases where the soft-decision data SD is logic '1'. For example, the number of memory cells among the selected memory cells where the soft-decision data SD is logic '1' may be relatively small. Therefore, it can be seen that a compression method of the soft-decision data SD according to the asymmetry of the number of logic '1' is possible.

Figure 7:
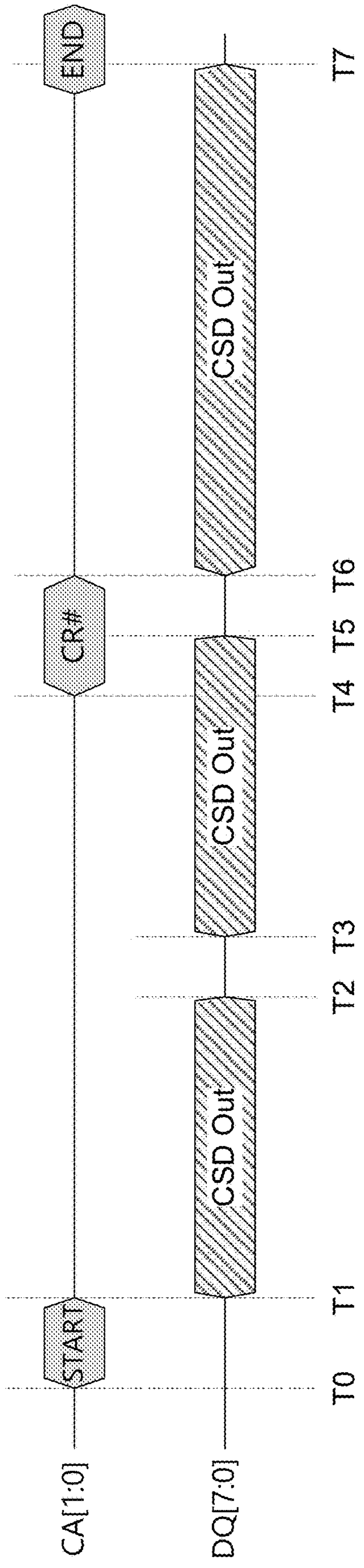
FIG. 7 is a timing diagram showing some example embodiments of a method for receiving compressed soft-decision data (CSD) using the separate command/address (SCA) protocol of the inventive concepts.

FIG. 7 is a timing diagram showing example embodiments of a method for receiving compressed soft-decision data CSD using the separate command/address SCA protocol of the inventive concepts. Referring to FIG. 7, the storage controller (1100, see FIG. 1) may control the compression operation of the soft-decision data SD of the nonvolatile memory device (1200, see FIG. 1) using the compression setting signals (START, CR #, END) transmitted to the command/address line CA.

At time T0, the storage controller 1100 transmits a start signal START that instructs the compression or output of the soft-decision data SD sensed by the nonvolatile memory device 1200. At this time, the storage controller 1100 may transmit the start signal START in the form of a packet, e.g., a specific vector, through the command/address line CA.

At time T1, the nonvolatile memory device 1200 will start compressing the soft-decision data SD stored in the page buffer circuit 1230. For example, the compression circuit (1235, see FIG. 3) will compress the soft-decision data SD provided from the page buffer circuit 1230 with a specific compression ratio (e.g., a default compression ratio) under the control of the control circuit 1250. The compressed soft-decision data CSD will be output through the data line DQ in a specific bit unit (e.g., 128-bit). For example, the 128-bit compressed soft-decision data CSD will be output through the data line DQ from time T1 to time T2, and then the subsequent compressed soft-decision data CSD will be output from time T3 to time T5. In some example embodiments, the compression may be a run-length based compression; example embodiments are not limited thereto.

At time T4, the storage controller 1100 transmits a compression ratio change signal CR # of the soft-decision data SD applied by the compression circuit 1235 to the nonvolatile memory device 1200. At this time, the storage controller 1100 can transmit a compression ratio change signal CR # in packet form through the command/address line CA.

At time T6, the nonvolatile memory device 1200 may perform the compression operation according to the changed compression ratio for the soft-decision data SD stored in the page buffer circuit 1230. The compression circuit 1235 may compress the soft-decision data SD provided from the page buffer circuit 1230 according to the changed compression ratio. The compressed soft-decision data CSD compressed according to the changed compression ratio will be output through the data line DQ from time T6 to time T7.

At time T7, the storage controller 1100 transmits the end signal END that instructs the end of output of the compressed soft-decision data CSD. At this time, the storage controller 1100 may transmit the end signal END in packet form through the command/address line CA. In response to the end signal END, the nonvolatile memory device 1200 will stop the output operation of the compressed soft-decision data CSD.

In the above, the method of transmitting the compression setting signals (START, CR #, END) through the command/address line CA and outputting the compressed soft-decision data CSD through the data line DQ in the storage device 1000 of the inventive concepts has been described. As the compression setting signals are provided through the command/address line CA, the compressed soft-decision data CSD can be received at high speed by the storage controller 1100.

Figure 8:
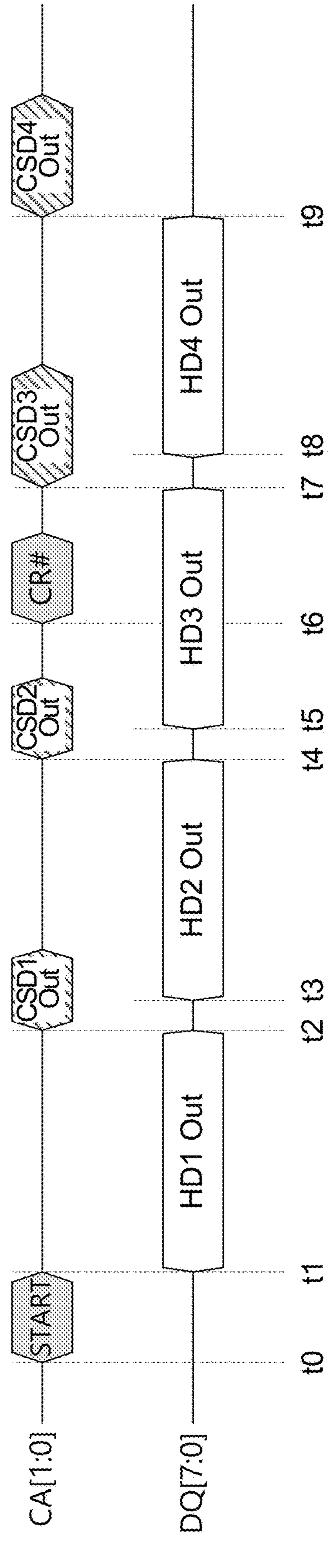
FIG. 8 is a timing diagram showing some example embodiments of receiving compressed soft-decision data (CSD) using the separate command/address (SCA) protocol of the inventive concepts.

FIG. 8 is a timing diagram showing other example embodiments of receiving compressed soft-decision data CSD using the separate command/address SCA protocol of the inventive concepts. Referring to FIG. 8, a storage controller (1100, see FIG. 1) may transmit a compression setting signal through a command/address line CA. The storage controller 1100 can receive compressed soft-decision data CSD through the command/address line CA.

At time t0, the storage controller 1100 transmits a start signal START that instructs compression of or output of the soft-decision data SD sensed by the nonvolatile memory device 1200. At this time, the storage controller 1100 can transmit the start signal START in the form of a packet through the command/address line CA.

At time t1, the nonvolatile memory device 1200 will start outputting the first hard-decision data HD1 stored in the page buffer circuit 1230 through the data line DQ. The first hard-decision data HD1 can be transferred from the page buffer circuit 1230 to the input/output circuit 1240 without a separate compression procedure. The first hard-decision data HD1 transferred to the input/output circuit 1240 will be transferred to the storage controller 1100 through the data line DQ from time t1 to time t2.

At time t2, the nonvolatile memory device 1200 will start compressing and outputting the first soft-decision data SD1 using the compression circuit (1235, see FIG. 3). Here, the first soft-decision data SD1 is data indicating the reliability of the first hard-decision data HD1. For example, the first soft-decision data SD1 is data sensed through soft-decision reading from the same memory cells where the first hard-decision data HD1 is sensed. The compression circuit 1235 will perform a compression operation on the first soft-decision data SD1 provided from the page buffer circuit 1230 under the control of the control circuit 1250. The compressed first soft-decision data CSD1 will be output through the command/address line CA in a specific bit unit (e.g., 128-bit). For example, the compressed first soft-decision data CSD1 can be output to the storage controller 1100 through the command/address line CA at time t2.

At time t3, the nonvolatile memory device 1200 may start outputting the second hard-decision data HD2 stored in the page buffer circuit 1230 through the data line DQ. The second hard-decision data HD2 can be transmitted from the page buffer circuit 1230 to the input/output circuit 1240 without a separate compression procedure. The second hard-decision data HD2 transmitted to the input/output circuit 1240 will be transmitted to the storage controller 1100 through the data line DQ from time t3 to time t4.

At time t4, the nonvolatile memory device 1200 starts compressing and outputting the second soft-decision data SD2 using the compression circuit 1235. Here, the second soft-decision data SD2 is data sensed as a soft-decision read result from the same memory cell as the second hard-decision data HD2. The compression circuit 1235 will execute a compression operation on the second soft-decision data SD2 provided from the page buffer circuit 1230 under the control of the control circuit 1250. The compressed second soft-decision data CSD2 will be output through the command/address line CA in a specific bit unit (e.g., 128-bit).

At time t5, the nonvolatile memory device 1200 outputs the third hard-decision data HD3 stored in the page buffer circuit 1230 through the data line DQ. The third hard-decision data HD3 can be transferred from the page buffer circuit 1230 to the input/output circuit 1240 without a separate compression procedure. The third hard-decision data HD3 transferred to the input/output circuit 1240 will be transferred to the storage controller 1100 through the data line DQ from time t5 to time t7.

At time t6, the storage controller 1100 transmits a compression ratio change signal CR # for changing the compression ratio applied to the compression circuit 1235 to the nonvolatile memory device 1200. At this time, the storage controller 1100 can transmit the compression ratio change signal CR # in the form of a packet through the command/address line CA.

At time t7, the nonvolatile memory device 1200 compresses the third soft-decision data SD3 stored in the page buffer circuit 1230 according to the changed compression ratio. For example, the compression circuit 1235 will compress the third soft-decision data SD3 provided from the page buffer circuit 1230 according to the changed compression ratio. The compressed third soft-decision data CSD3 according to the changed compression ratio will be transmitted from the nonvolatile memory device 1200 to the storage controller 1100 via the command/address line CA.

At time t8, the nonvolatile memory device 1200 outputs the fourth hard-decision data HD4 stored in the page buffer circuit 1230 via the data line DQ. The fourth hard-decision data HD4 can be transmitted from the page buffer circuit 1230 to the input/output circuit 1240 without a separate compression procedure. The fourth hard-decision data HD4 transmitted to the input/output circuit 1240 will be transmitted to the storage controller 1100 via the data line DQ from time t8 to time t9.

At time t9, the nonvolatile memory device 1200 will perform the compression operation on the fourth soft-decision data SD4 stored in the page buffer circuit 1230. The compression circuit 1235 will compress the fourth soft-decision data SD4 provided from the page buffer circuit 1230. The compressed fourth soft-decision data CSD4 is transmitted from the nonvolatile memory device 1200 to the storage controller 1100 via the command/address line CA.

In the above, the method of transmitting the compression setting signal and the compressed soft-decision data through the command/address line CA in the storage device 1000 of the inventive concepts has been described. As the compressed soft-decision data CSD via the command/address line CA is output to the storage controller 1100, high-speed reliability data reception and decoding performance can be guaranteed.

Figure 9:
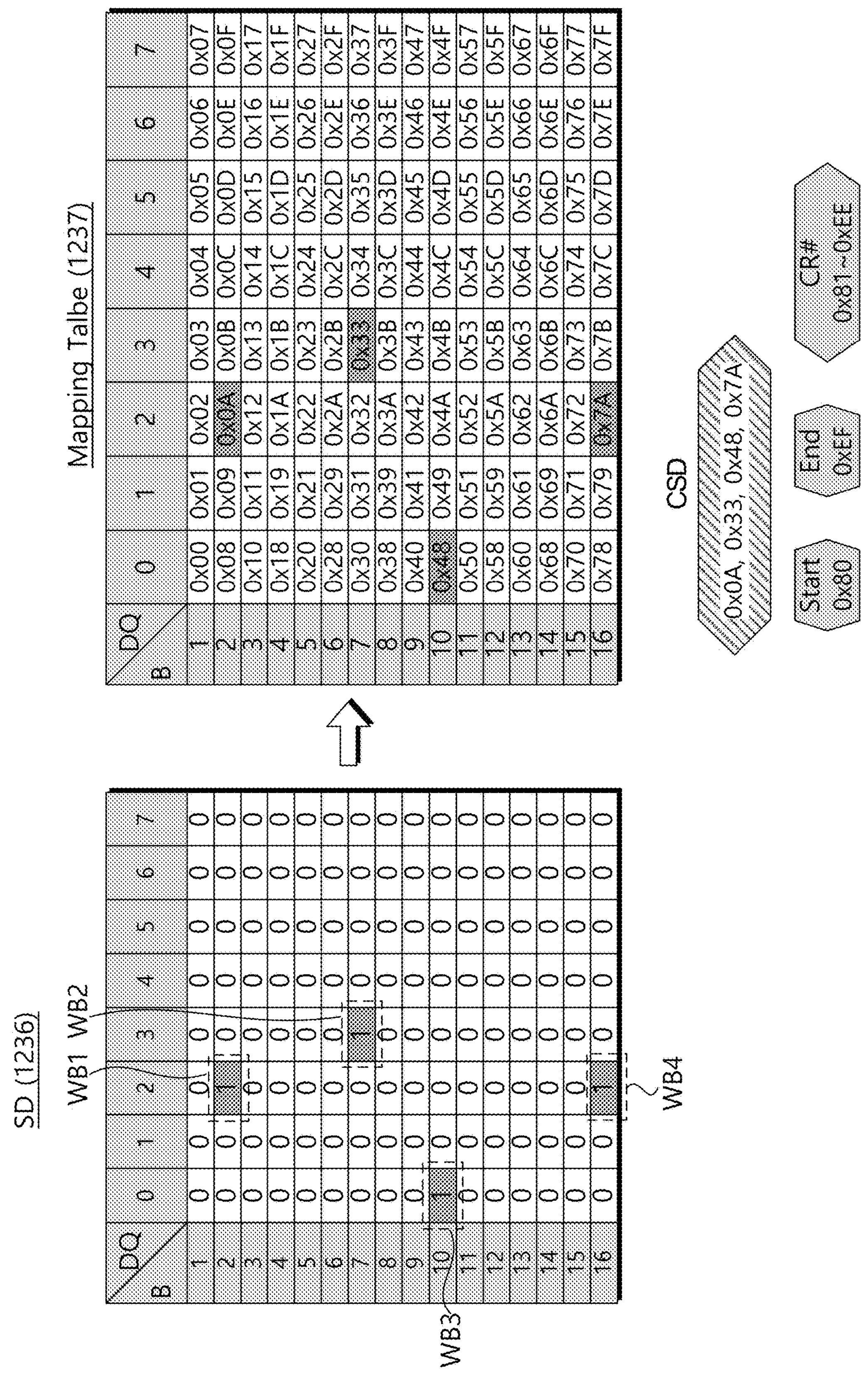
FIG. 9 is a table briefly showing a compression method of soft-decision data for applying the separate command/address (SCA) protocol of the inventive concepts.

FIG. 9 is a table briefly showing a compression method of soft-decision data for applying the separate command/address SCA protocol of the inventive concepts. Referring to FIG. 9, the compression circuit 1235 can provide the location of a weak bit with low reliability of the soft-decision data (SD, 1236) in the mapping table 1237 as compressed soft-decision data CSD The soft-decision data 1236 can be composed of a plurality of bits sensed by a soft-decision read operation. The soft-decision data 1236 may be composed of strong bits and weak bits. For example, the weak bit can be assigned to logic '1' and the strong bit can be assigned to logic '0'. For example, the soft-decision data 1236 in the illustrated example can include four weak bits (WB1 to WB4). The soft-decision data 1236 may have a size that is a multiple of the number of data pins of the nonvolatile memory device 1200. For example, the soft-decision data 1236 may have a size that is 16 times the number of data pins (DQ0 to DQ7). In some example embodiments, the soft-decision data 1236 may be expressed as 128-bits.

The number of weak bits (logic '1') of the soft-decision data 1236 is much smaller than the number of strong bits (logic '0') with high reliability. Therefore, a compression effect may be provided by transmitting only the location of the weak bit (logic '1') in the mapping table 1237. For example, the weak bit WB1 corresponds to the index code '0x0A' of the mapping table 1237. The weak bit WB2 corresponds to the index code '0x33' of the mapping table 1237, the weak bit WB3 corresponds to the index code '0x48' of the mapping table 1237, and the weak bit WB4 corresponds to the index code '0x7A' of the mapping table 1237.

The compression circuit 1235 can generate '0x0A', '0x33', '0x48', and '0x7A' as compressed soft-decision data CSD using the mapping relationship between the above-described soft-decision data 1236 and the mapping table 1237. When a read command is provided from the memory controller 1100, the nonvolatile memory device 1200 will output the hard-decision data and the soft-decision data of the read-requested data according to the separate command/address SCA protocol. For example, the nonvolatile memory device 1200 outputs compressed soft-decision data '0x0A', '0x33', '0x48' and '0x7A' in response to a start signal START transmitted from the storage controller 1100 to the command/address line CA. At this time, the compressed soft-decision data '0x0A', '0x33', '0x48' and '0x7A' may be transmitted to the data line DQ or the command/address line CA according to example embodiments.

The remaining index codes '0x80' to '0xEF' that are not used in the mapping table 1237 may be used as compression setting signals transmitted to the nonvolatile memory device 1200 using the command/address line CA. For example, a start signal START indicating the start of compression or output of soft-decision data can be transmitted using index code '0x80', an end signal END indicating the end of compression or output can be transmitted using index code '0xEF', and a compression ratio change signal CR # indicating a change in compression ratio can be transmitted using index codes '0x81' to '0xEE'.

Figure 10:
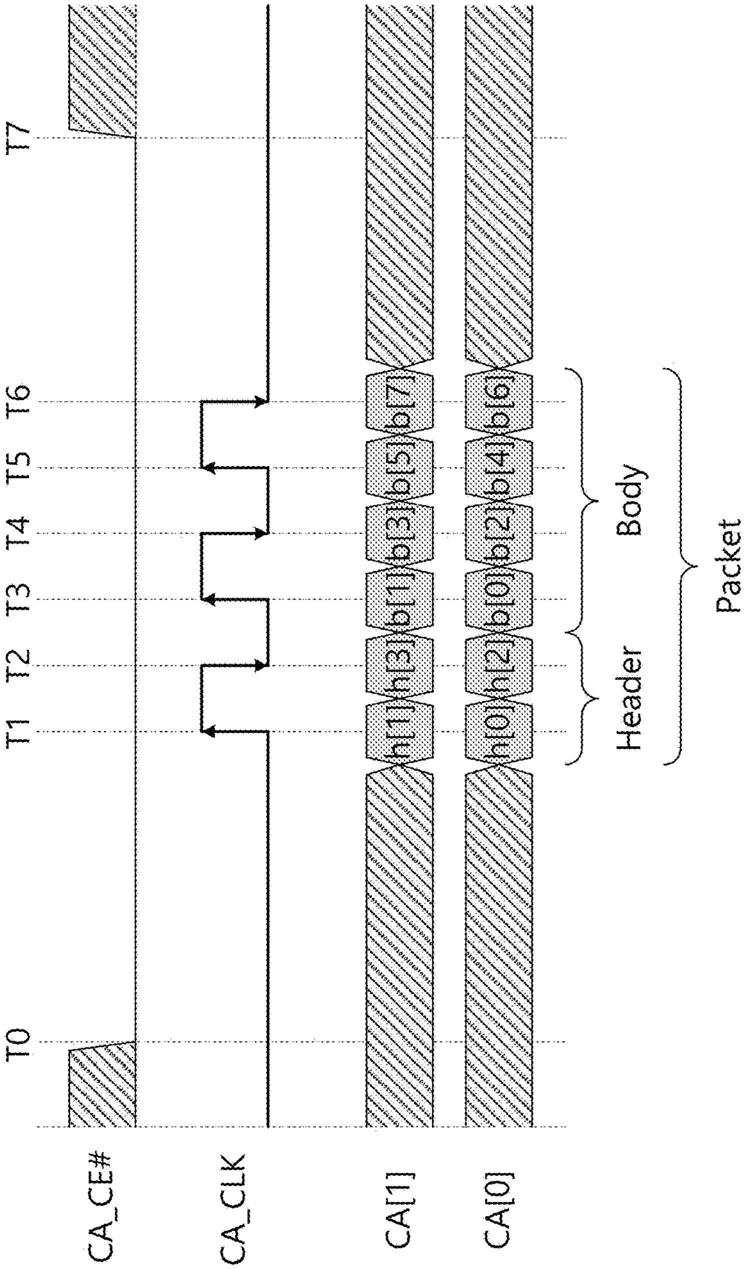
FIG. 10 is a timing diagram showing an example of a packet configuration applied to the separate command/address (SCA) protocol of the inventive concepts.

FIG. 10 is a timing diagram showing an example of a packet configuration applied to the separate command/address SCA protocol of the inventive concepts. Referring to FIG. 10, the storage controller 1100 can transmit a command, data, and an address to a nonvolatile memory device 1200 in the form of a packet through the command/address line CA. Here, an example in which a packet transmitted through the command/address line CA is composed of a 4-bit header and an 8-bit body will be described.

At time T0, the storage controller 1100 activates a chip enable signal CA_CE # for selecting a chip of a nonvolatile memory device 1200 to which the separate command/address SCA protocol is applied to a low level. In response to the activation of the chip enable signal CA_CE #, the nonvolatile memory device 1200 prepares for data exchange through the command/address line CA.

At time T1, the storage controller 1100 sequentially transmits a packet header 'Header' to the command/address line CA along with the transition of the clock signal CA_CLK. At time T1, the head bits (h[0], h[1]) of the command/address line CA will be transmitted to the input/output circuit 1240 of the nonvolatile memory device 1200 in synchronization with the rising edge of the clock signal CA_CLK. At time T2, the head bits (h[2], h[3]) of the command/address line CA will be transmitted to the input/output circuit 1240 of the nonvolatile memory device 1200 in synchronization with the falling edge of the clock signal CA_CLK. At time T3, the storage controller 1100 sequentially transmits the packet body 'Body' to the command/address line CA along with the transition of the clock signal CA_CLK.

At time T3, the body bits (b[0], b[1]) of the command/address line CA will be transmitted to the input/output circuit 1240 of the nonvolatile memory device 1200 in synchronization with the rising edge of the clock signal CA_CLK. And at time T4, the body bits (b[2], b[3]) of the command/address line CA will be transmitted to the input/output circuit 1240 of the nonvolatile memory device 1200 in synchronization with the falling edge of the clock signal CA_CLK. At time T5, the body bits (b[4], b[5]) of the command/address line CA will be transmitted to the input/output circuit 1240 of the nonvolatile memory device 1200 in synchronization with the rising edge of the clock signal CA_CLK. At time T6, the body bits (b[6], b[7]) of the command/address line CA will be transmitted to the input/output circuit 1240 of the nonvolatile memory device 1200 in synchronization with the falling edge of the clock signal CA_CLK. When the transmission of the packet is completed, the storage controller 1100 can deactivate the chip enable signal CA_CE # at time T7.

Various commands, addresses, and/or other types of data to be transmitted can be defined through the bit values of the 4-bit header (h[0], h[1], h[2], h[3]) of the packet transmitted through the command/address line CA. For example, the read command of the compressed soft-decision data CSD of the inventive concepts may also be provided in the form of a packet transmitted through the command/address line CA of the above-described form. It will be well understood that the number of bits of the header or body of the packet may be variously changed depending on the example embodiments.

FIG. 11 is a table showing an example definition according to the bit value of the packet header of FIG. 10. Referring to FIG. 11, data output, data input, command, address, etc. to the command/address line CA may be defined according to the bit value of the packet header.

The packet header bits (CA[1], CA[0]) may be transmitted to the nonvolatile memory device 1200 in synchronization with the rising edge of the clock signal CA_CLK. And the packet header bits (CA[1], CA[0]) are transmitted to the nonvolatile memory device 1200 in synchronization with the falling edge of the clock signal CA_CLK. When the bit value of the 4-bit packet header bits transmitted in synchronization with the rising edge and falling edge of the clock signal CA_CLK is '0000', it may correspond to data output (CA data out) through the command/address line CA. For example, the packet header bit value '0000' instructs data output from the nonvolatile memory device 1200 to the storage controller 1100. The nonvolatile memory device 1200 may use the packet header bit value '0000' to notify the storage controller 1100 of the data output when outputting specific data. The packet body following the packet header bit value '0000' may provide compressed soft-decision data CSD or compression ratio information for the operation of the decompressor (1170, see FIG. 1) of the storage controller 1100.

When the bit value of the 4-bit packet header bits is '0010', the bit value may correspond to data input through the command/address line CA. For example, the packet header bit value '0010' corresponds to a packet header for inputting data from the storage controller 1100 to the nonvolatile memory device 1200. The storage controller 1100 can use the packet header bit value '0010' through the command/address line CA to notify the nonvolatile memory device 1200 of the input of specific data. The packet body following the packet header bit value '0010' can transmit compression setting data such as a setting value for compression or a mapping table for compression.

When the bit value of the 4-bit packet header bits is '0100', it can indicate an address transmitted from the storage controller 1100 to the nonvolatile memory device 1200 through the command/address line CA. Information about the type of the input address may be transmitted through the packet body. And when the bit value of the 4-bit packet header bits is '1000', it indicates a command provided from the storage controller 1100 to the nonvolatile memory device 1200 through the command/address line CA. The definition of the type of the command may be transmitted through the packet body.

As described above, various definitions of packet headers are possible depending on the bit value of the 4-bit packet header bits. For example, in the case of a request for output of compressed soft-decision data CSD using the separate command/address SCA protocol, '1000' indicating the command of the packet header and information indicating a request for compressed soft-decision data CSD may be provided through the packet body.

Figure 12:
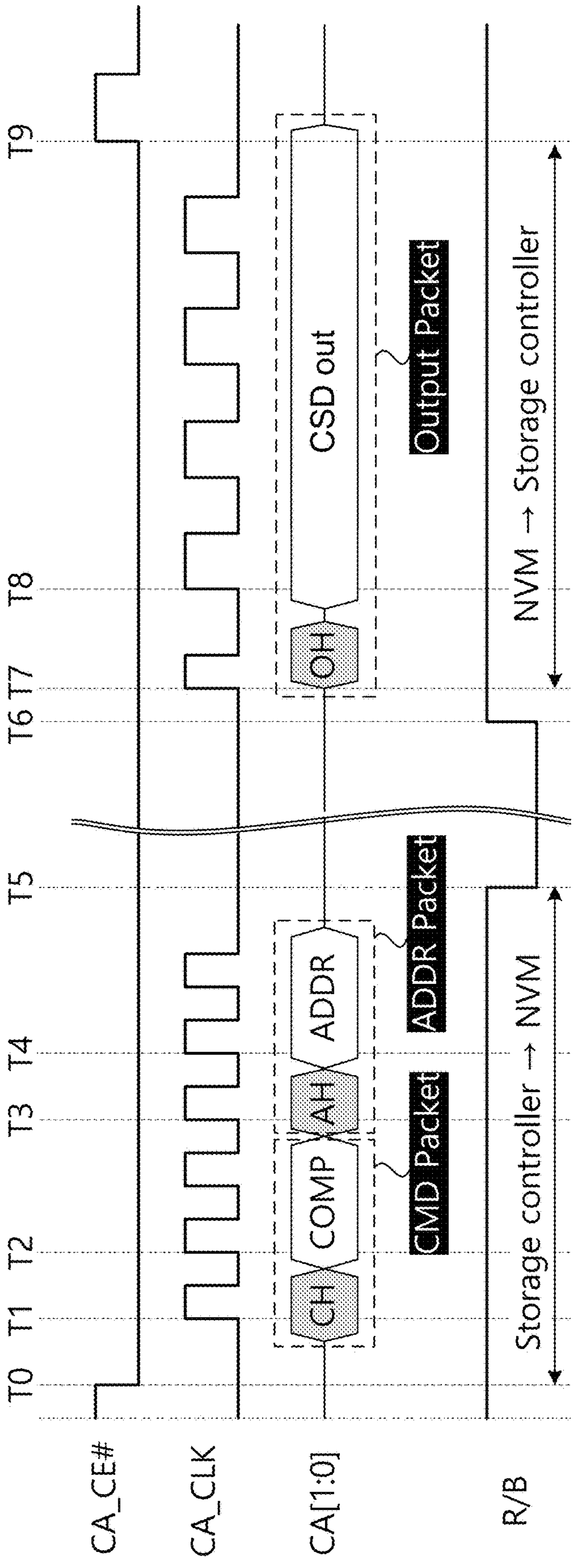
FIG. 12 is a timing diagram showing the operation of a storage controller and a nonvolatile memory device for receiving compressed soft-decision data (CSD) using the separate command/address (SCA) protocol of the inventive concepts.

FIG. 12 is a timing diagram showing the operation of a storage controller and a nonvolatile memory device for receiving compressed soft-decision data CSD using the separate command/address SCA protocol of the inventive concepts. Referring to FIG. 12, a storage controller (1100, see FIG. 1) can transmit a command packet and an address packet to a nonvolatile memory device 1200 using a command packet command/address line (CA[1:0]). In response, the nonvolatile memory device 1200 can output compressed soft-decision data CSD or compression ratio information, etc. to the storage controller 1100 using a data output packet.

At time T0, the storage controller 1100 activates a chip enable signal CA_CE # to a low level for selecting the nonvolatile memory device 1200. A command packet and an address packet for outputting compressed soft-decision data CSD are transmitted from the storage controller 1100 to the nonvolatile memory device 1200.

At time T1, a command header CH of a command packet is provided. In order to transmit the command header CH, the header bits of the 4-bit command packet will be transmitted to the nonvolatile memory device 1200 at the rising edge and falling edge of the clock signal CA_CLK, respectively. At time T2, the body bits of the 8-bit command packet will be transmitted to the nonvolatile memory device 1200 in synchronization with the rising edge and falling edge of the clock signal CA_CLK, respectively. Here, it is assumed that the body bits COMP of the command packet are bit values requesting an output operation of compressed soft-decision data CSD.

At time T3, an address header AH of an address packet is provided. In order to transmit the address header AH, the header bits of the 4-bit address packet will be transmitted to the nonvolatile memory device 1200 at the rising edge and falling edge of the clock signal CA_CLK, respectively. At time T4, the body bits of the 8-bit address packet will be transmitted to the nonvolatile memory device 1200 in synchronization with the rising edge and falling edge of the clock signal CA_CLK, respectively.

At time T5, when the command packet and the address packet are input to the nonvolatile memory device 1200, the nonvolatile memory device 1200 will transition the ready/busy pin R/B to a low level. When the ready/busy pin R/B is at a low level, data or packet transmission to the nonvolatile memory device 1200 is blocked. After transitioning the ready/busy pin R/B to a low level, the nonvolatile memory device 1200 performs an operation requested through a command packet and an address packet. For example, the nonvolatile memory device 1200 can sense soft-decision data SD from memory cells of the transmitted address and perform a compression operation on the sensed soft-decision data.

At time T6, the nonvolatile memory device 1200 transitions the ready/busy pin R/B to a high level again and informs the storage controller 1100 that data input/output is possible. At the following T7 time point, the nonvolatile memory device 1200 will output the data output header OH that instructs the output of the compressed soft-decision data CSD in synchronization with the rising edge and falling edge of the clock signal CA_CLK. Then, after the T8 time point, the compressed soft-decision data CSD corresponding to the data output body will be transmitted to the storage controller 1100 through the command/address line CA[1:0]. At the T9 time point when the output of the compressed soft-decision data CSD is completed, the storage controller 1100 can transition the chip enable signal CA_CE # to a high level and terminate the output operation of the compressed soft-decision data CSD in the selected nonvolatile memory device 1200. If the compressed soft-decision data CSD must be output through a plurality of data output packets, the number of data output packets may increase.

In the above, the exchange process of command packets, address packets, and data output packets between the storage controller 1100 and the nonvolatile memory device 1200 through the command/address line CA has been briefly described. Using the separate command/address SCA protocol, the storage controller 1100 and the nonvolatile memory device 1200 can exchange reliability data at high speed. Therefore, the decoding operation of the reliability data in the storage controller 1100 can be processed at high speed.

Figure 13:
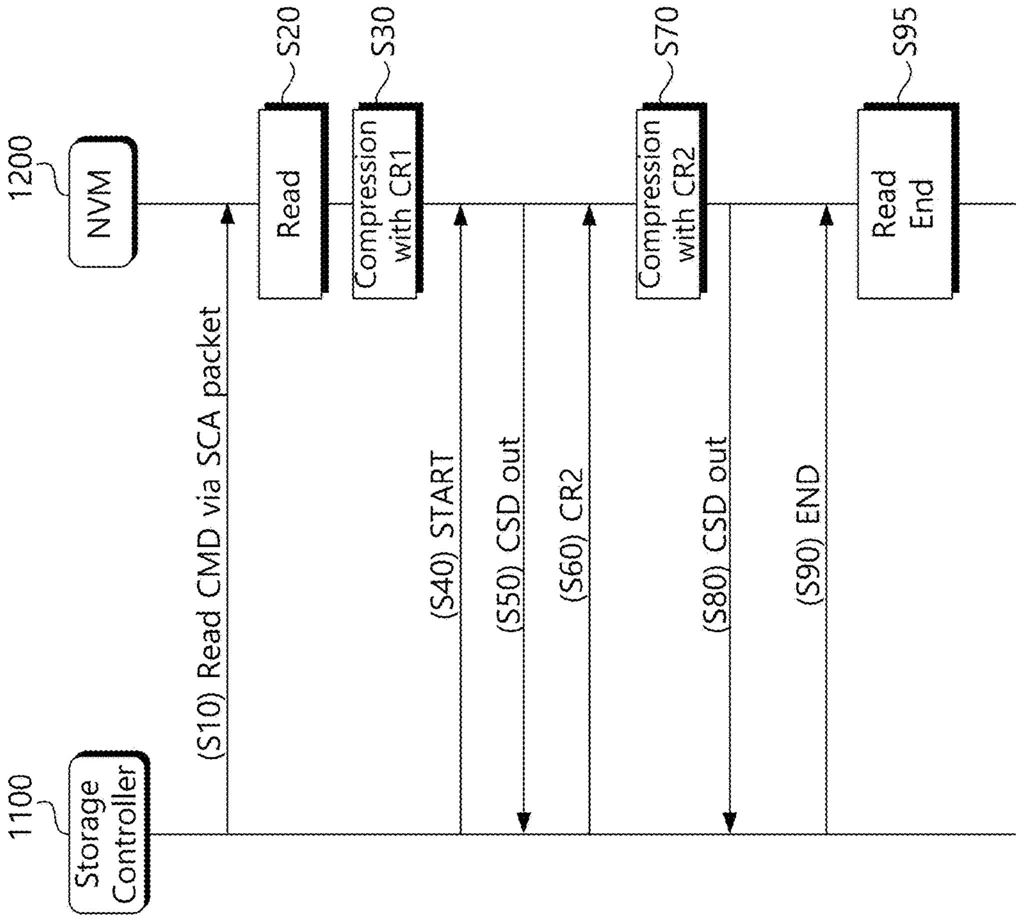
FIG. 13 is a diagram showing a process of outputting compressed soft-decision data CSD from a storage device using the separate command/address (SCA) protocol.

FIG. 13 is a drawing showing a method of outputting compressed soft-decision data CSD from the storage device using the separate command/address SCA protocol. Referring to FIG. 13, a storage controller 1100 can read the compressed soft-decision data CSD from a nonvolatile memory device 1200 using the command/address line CA.

In operation S10, the storage controller 1100 may provide a read command of compressed soft-decision data CSD to the nonvolatile memory device 1200 according to the separate command/address SCA protocol. At this time, a target area may be selected through a command packet and an address packet, and compressed soft-decision data CSD sensed in the selected area may be requested. The command packet and the address packet may be transmitted to the nonvolatile memory device 1200 through a command/address line CA, respectively.

In operation S20, the nonvolatile memory device 1200 selects a memory area corresponding to the provided address. Then, the nonvolatile memory device 1200 will sense soft-decision data SD and hard-decision data HD for the selected area.

In operation S30, the nonvolatile memory device 1200 may compress the soft-decision data SD according to the default compression ratio CR1 or the compression ratio transmitted through the command packet.

In operation S40, the storage controller 1100 will transmit a start signal START through the command/address line CA.

In operation S50, the nonvolatile memory device 1200 will transmit the compressed soft-decision data CSD to the storage controller 1100 through the command/address line CA or the data line DQ in response to the start signal START.

In operation S60, the storage controller 1100 will transmit a compression ratio change signal CR2 through the command/address line CA.

In operation S70, the nonvolatile memory device 1200 changes the compression ratio for the soft-decision data SD from CR1 to CR2 in response to the compression ratio change signal CR2. Then, it will perform a compression operation on the sensed soft-decision data SD according to the changed compression ratio CR2.

In operation S80, the nonvolatile memory device 1200 transmits the compressed soft-decision data CSD according to the changed compression ratio CR2 to the storage controller 1100.

In operation S90, the storage controller 1100 will transmit an end signal END through the command/address line CA.

In operation S95, the nonvolatile memory device 1200 terminates the read or compression operation on the soft-decision data SD.

In the above, data transmission procedures between the storage controller 1100 and the nonvolatile memory device 1200 according to the separate command/address SCA protocol have been exemplarily described. The storage device 1000 can perform high-speed soft-decision decoding by transmitting compressed soft-decision data CSD or a setting signal through a command/address line CA.

Figure 14:
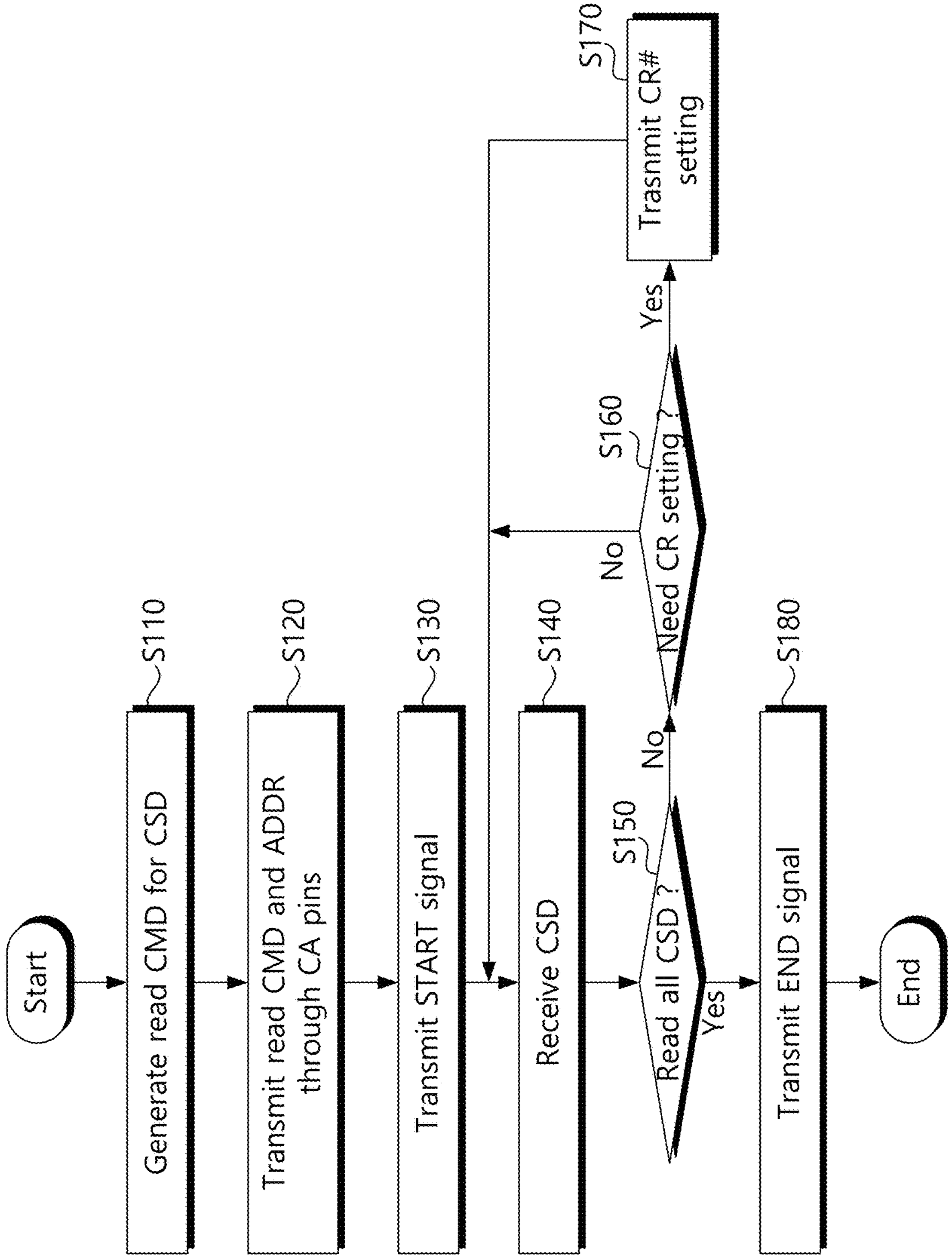
FIG. 14 is a flowchart showing an operation method according to the separate command/address (SCA) protocol of the storage controller of the inventive concepts.

FIG. 14 is a flowchart showing an operation method according to the separate command/address SCA protocol of a storage controller of the inventive concepts. Referring to FIG. 14, the storage controller 1100 can request reliability data from a nonvolatile memory device 1200 through the command/address line CA according to the separate command/address SCA protocol and receive the requested reliability data.

In operation S110, the storage controller 1100 generates a read command for requesting compressed soft-decision data CSD as an example of reliability data.

In operation S120, the storage controller 1100 transmits the generated read command and address to the nonvolatile memory device 1200 through the command/address line CA.

In operation S130, the storage controller 1100 transmits a start signal START to the nonvolatile memory device 1200 through the command/address line CA. Then, the nonvolatile memory device 1200 will compress the sensed soft-decision data SD from the selected area and return the compressed soft-decision data CSD to the storage controller 1100.

In operation S140, the storage controller 1100 receives the compressed soft-decision data CSD output from the nonvolatile memory device 1200. The received compressed soft-decision data CSD will be decoded by the decompressor (1170, see FIG. 1).

In operation S150, the storage controller 1100 determines whether all the compressed soft-decision data CSD requested through the read command have been received. If all the compressed soft-decision data CSD have been received ('Yes' direction), the procedure moves to operation S180. On the other hand, if all the requested compressed soft-decision data CSD have not been received ('No' direction), the procedure moves to operation S160.

In operation S160, the storage controller 1100 determines whether a change in the compression ratio CR is necessary. If it is determined that a change in the compression ratio CR is necessary ('Yes' direction), the procedure moves to operation S170. On the other hand, if it is determined that a change in the compression ratio CR is unnecessary ('No' direction), the procedure returns to operation S140 and continuously receives compressed soft-decision data CSD without a change in the compression ratio CR.

In operation S170, the storage controller 1100 transmits the changed compression ratio information CR # to the nonvolatile memory device 1200. Then, the procedure returns to operation S140 and receives compressed soft-decision data CSD according to the changed compression ratio CR #.

In operation S180, the storage controller 1100 determines that the reception of the requested compressed soft-decision data CSD is completed, and transmits an end signal END for the read operation of the compressed soft-decision data CSD to the nonvolatile memory device 1200 via the command/address line CA. The read operation of the compressed soft-decision data CSD is terminated according to the end signal END.

Figure 15:
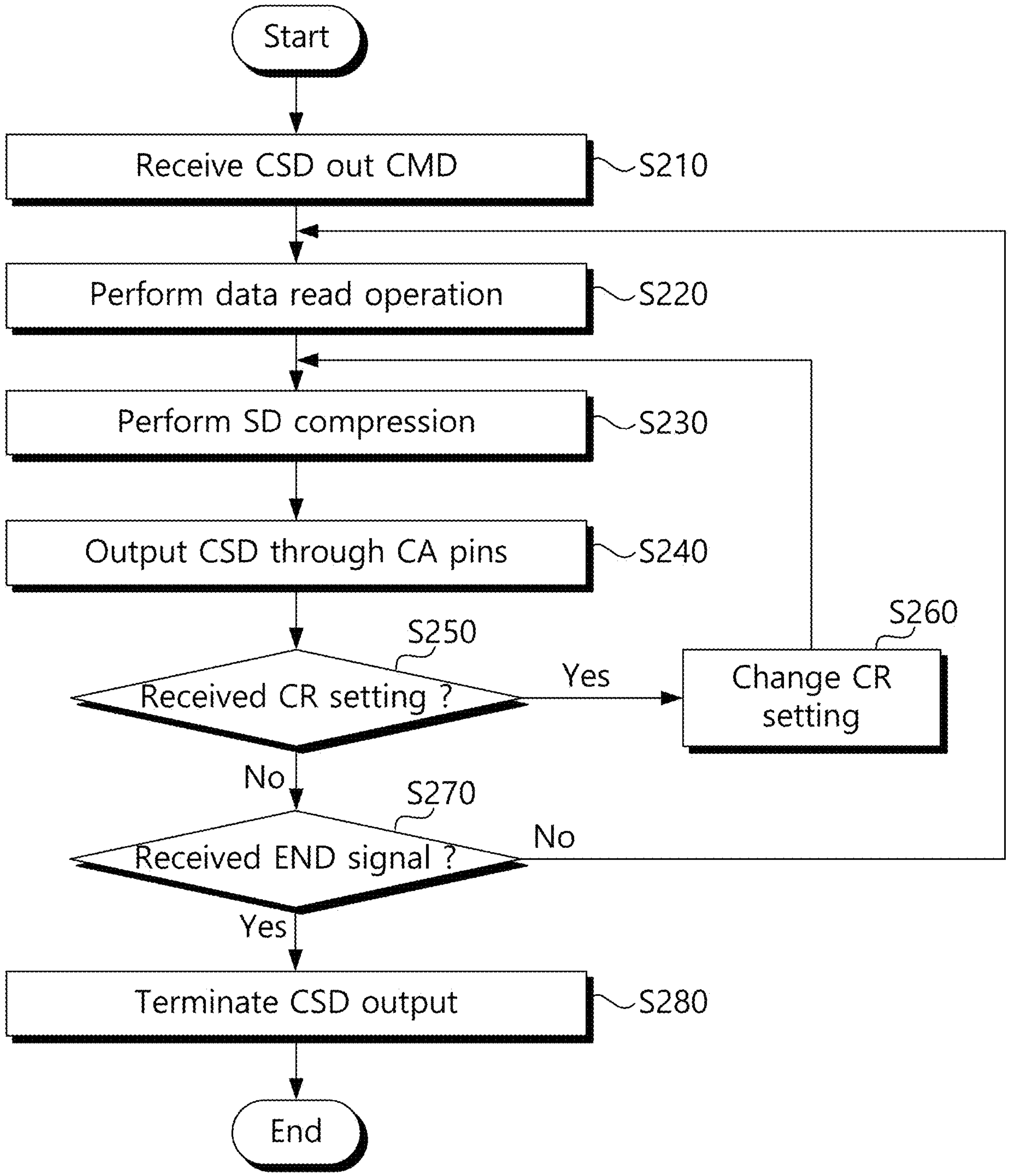
FIG. 15 is a flow chart showing an operation method according to the separate command/address (SCA) protocol of the nonvolatile memory device of the inventive concepts.

FIG. 15 is a flowchart showing an operation method according to the separate command/address SCA protocol of the nonvolatile memory device of the inventive concepts. Referring to FIG. 15, a nonvolatile memory device 1200 receives a read request for reliability data through the command/address line CA according to the separate command/address SCA protocol. And the nonvolatile memory device 1200 can transmit the requested read reliability data to a storage controller 1100 according to the separate command/address SCA protocol.

In operation S210, the nonvolatile memory device 1200 receives a read command for requesting compressed soft-decision data CSD as an example of reliability data.

In operation S220, the nonvolatile memory device 1200 senses soft-decision data SD for a selected memory area in response to the read command for the compressed soft-decision data CSD.

In operation S230, the compression circuit (1235, see FIG. 3) of the nonvolatile memory device 1200 performs compression operation on the sensed soft-decision data SD according to compression ratio information included in the read command or a default compression ratio.

In operation S240, the nonvolatile memory device 1200 outputs the compressed soft-decision data CSD to the storage controller 1100 through the command/address line CA or through the data line DQ.

In operation S250, the nonvolatile memory device 1200 determines whether a compression ratio change signal CR # is received from the storage controller 1100. If the compression ratio change signal CR # is received ('Yes' direction), the procedure moves to operation S260. On the other hand, if the compression ratio change signal CR # is not received ('No' direction), the procedure moves to operation S270.

In operation S260, the nonvolatile memory device 1200 changes the compression ratio of the soft-decision data SD to a value requested by the storage controller 1100. Then, the procedure moves to operation S230 to compress the soft-decision data SD according to the changed compression ratio CR.

In operation S270, the nonvolatile memory device 1200 determines whether an end signal END is received from the storage controller 1100. If it is determined that an end signal END is received ('Yes' direction), the procedure moves to operation S280. On the other hand, if the reception of the end signal END is not detected ('No' direction), the procedure returns to operation S220 and continues the read operation to generate the compressed soft-decision data CSD.

In operation S280, the nonvolatile memory device 1200 terminates the output procedure of the compressed soft-decision data CSD.

Figure 16:
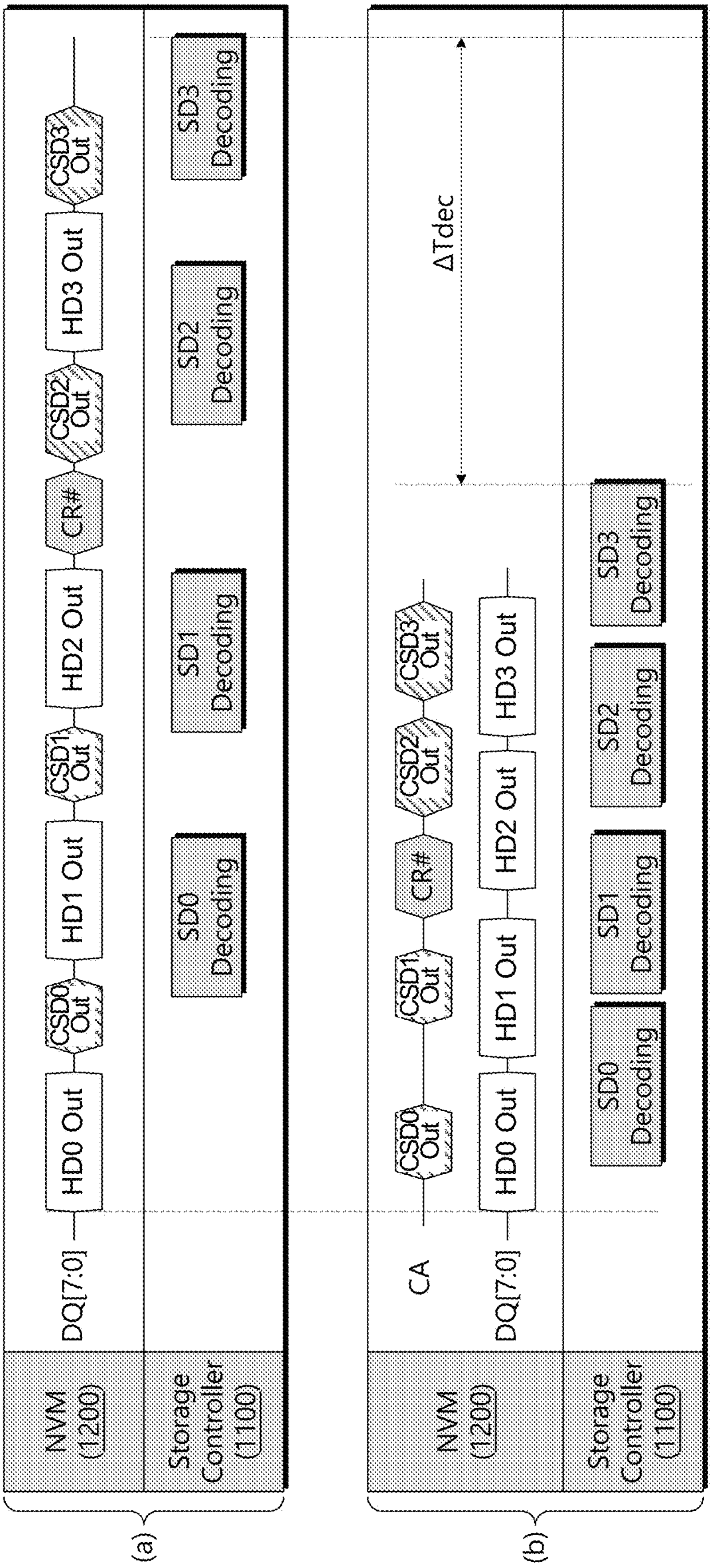
FIG. 16 is a timing diagram showing the effect of reducing the decoding time of the storage device when receiving compressed soft-decision data (CSD) according to the separate command/address (SCA) protocol of the inventive concepts.

FIG. 16 is a timing diagram showing the effect of reducing the decoding time of a storage device when receiving compressed soft-decision data CSD according to the separate command/address SCA protocol of the inventive concepts. Referring to FIG. 16, the decoding time of soft-decision data performed in a storage controller can be significantly reduced by using the separate command/address SCA protocol of the inventive concepts.

(a) shows a soft-decision decoding operation in a storage device 1000 using a general NAND protocol. In some example embodiments, hard-decision data HD, compressed soft-decision data CSD, and a compression setting signal such as a compression ratio change signal CR # are transmitted through a data line DQ. That is, hard-decision data HD and compressed soft-decision data CSD are transmitted from a nonvolatile memory device 1200 to a storage controller 1100 through a data line DQ. Compression setting signals such as a start signal START, a compression ratio change signal CR #, and an end signal END are transmitted from the storage controller 1100 to the nonvolatile memory device 1200 through the data line DQ.

The storage controller 1100 decodes hard-decision data HD0, HD1, HD2 and HD3, and compressed soft-decision data CSD0, CSD1, CSD2 and CSD3 sequentially output through the data line DQ. Decoding for error correction or reliability assurance for hard-decision data HD0 can be performed after the compressed soft-decision data CSD0 is received. Similarly, decoding for error correction or reliability assurance for hard-decision data HD1 can be performed after the compressed soft-decision data CSD1 is received. In order for decoding to be completed in this manner, both hard-decision data HD0, HD1, HD2 and HD3 and compressed soft-decision data CSD0, CSD1, CSD2 and CSD3 must be received by the storage controller 1100. Since the hard-decision data HD, compressed soft-decision data CSD, and compression ratio change signal CR # are transmitted through the data line DQ, it can be seen that the transmission speed and decoding speed are also reduced.

(b) shows the soft-decision decoding operation in the storage device 1000 using the separated command/address SCA protocol of the inventive concepts. In some example embodiments, the hard-decision data HD is transmitted through the data line DQ, and the compression setting signal such as the compressed soft-decision data CSD or compression ratio change signal CR # is transmitted through the command/address line CA.

The storage controller 1100 performs decoding using hard-decision data HD0, HD1, HD2 and HD3 output through the data line DQ and compressed soft-decision data CSD0, CSD1, CSD2 and CSD3 transmitted through the command/address line CA. Since the hard-decision data HD0, HD1, HD2 and HD3 and the compressed soft-decision data CSD0, CSD1, CSD2 and CSD3 are received in parallel, the decoding operation using the soft-decision data in the storage controller 1100 can be actually accelerated. For example, the transmission speed and decoding speed can be increased by the parallel transmission of the hard-decision data HD0, HD1, HD2 and HD3 and the compressed soft-decision data CSD0, CSD1, CSD2 and CSD3.

Ultimately, when using the separate command/address SCA protocol of (b), the decoding time in the storage controller 1100 can be shortened by the time difference ΔTdec compared to when using the general NAND protocol of (a). Accordingly, the read performance or operation performance of the storage device 1000 can be improved.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

The above are specific example embodiments for carrying out the inventive concepts. In addition to the above-described example embodiments, the inventive concepts may include simple design changes or easily changeable example embodiments. The inventive concepts will include techniques that can be easily modified and implemented using the example embodiments. Therefore, the scope of the inventive concepts should not be limited to the above-described example embodiments, and should be defined by the claims and equivalents of the claims of the inventive concepts as well as the claims to be described later. Additionally example embodiments are not necessarily mutually exclusive with one another. For example, some example embodiments may include one or more features described with reference to one or more figures, and may also include one or more other features described with reference to one or more other figures.

What is claimed is:

1. A storage device comprising:

a nonvolatile memory device; and a storage controller configured to transmit a command and an address to the nonvolatile memory device through a command/address line that is separate from a data line, wherein the command requests compressed soft-decision data from the nonvolatile memory device, receive the compressed soft-decision data output from the nonvolatile memory device, and decompress the compressed soft-decision data, wherein the nonvolatile memory device is configured to sense read data and reliability data from a memory area corresponding to the address and to transmit the read data and the reliability data to the storage controller, and wherein the storage controller is configured to transmit a setting signal associated with controlling output of the reliability data to the nonvolatile memory device using the command/address line.

2. The device of claim 1, wherein the nonvolatile memory device is configured to transmit the reliability data to the storage controller via the command/address line.

3. The device of claim 1, wherein the read data is hard-decision data associated with the memory area, and the reliability data is soft-decision data corresponding to the memory area.

4. The device of claim 3, wherein the reliability data corresponds to compressed data of the soft-decision data.

5. The device of claim 4, wherein the setting signal includes at least one of a start signal, a compression rate change signal, and an end signal, the start signal, the compression rate change signal, and the end signal associated with compressing the soft-decision data.

6. The device of claim 3, wherein the nonvolatile memory device comprises a compression circuit configured to perform a compression operation on the soft-decision data in response to the setting signal.

7. The device of claim 1, wherein the storage controller is configured to transmit the command or the address in the form of a packet including a header part and a body part, respectively.

8. The device of claim 7, wherein a bit value of the header part is defined according to a transmission direction of data transmitted to the command/address line.

9. A method of operating a storage controller for controlling a nonvolatile memory device, comprising:

transmitting a command and an address requesting compressed soft-decision data to the nonvolatile memory device through a command/address line that is separate from a data line;

receiving the compressed soft-decision data output from the nonvolatile memory device; and decompressing the compressed soft-decision data.

10. The method of claim 9, further comprising:

transmitting, to the command/address line, a start signal, the start signal instructing compression or the start signal being an output of the compressed soft-decision data.

11. The method of claim 10, further comprising:

transmitting a compression ratio change signal associated with adjusting a compression ratio of the compressed soft-decision data to the command/address line.

12. The method of claim 11, further comprising:

transmitting, to the command/address line, an end signal, the end signal instructing the end of compression or the end signal being an output of the compressed soft-decision data.

13. The method of claim 10, further comprising:

transmitting a clock signal associated with transmitting the command or the address to the command/address line.

14. The method of claim 9, wherein the compressed soft-decision data is transmitted to the storage controller via the command/address line.

15. The method of claim 9, wherein the storage controller transmits the command or the address to the nonvolatile memory device through the command/address line in the form of a packet including a header part and a body part, respectively.

16. An operating method of a nonvolatile memory device, comprising:

receiving a command and an address through a command/address line, wherein the command comprises a request for compressed soft-decision data, and wherein the command/address line is separate from a data line;

sensing a memory area corresponding to the command and the address to generate the compressed soft-decision data and hard-decision data; and transmitting the compressed soft-decision data to a storage controller in response to a start signal provided through the command/address line; and decompressing the compressed soft-decision data.

17. The method of claim 16, wherein the nonvolatile memory device transmits the compressed soft-decision data to the storage controller via the command/address line, and transmits hard-decision data via the data line.

18. The method of claim 17, further comprising:

compressing the compressed soft-decision data.

19. The method of claim 18, further comprising:

receiving a compression ratio change signal associated with adjusting the compression ratio of the compressed soft-decision data from the storage controller via the command/address line.

20. The method of claim 19, wherein the receiving the command or the address includes receiving the command or the address in the form of a packet via the command/address line.

* * * * *